(12) United States Patent
Gaugler et al.

(10) Patent No.: US 12,087,977 B2
(45) Date of Patent: Sep. 10, 2024

(54) SEPARATOR PLATE ARRANGEMENT FOR AN ELECTROCHEMICAL SYSTEM

(71) Applicant: Reinz-Dichtungs-GmbH, Neu-Ulm (DE)

(72) Inventors: Bernd Gaugler, Ulm (DE); Claudia Kunz, Ulm (DE); Stephan Wenzel, Pfaffenhofen (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 403 days.

(21) Appl. No.: 17/028,653

(22) Filed: Sep. 22, 2020

(65) Prior Publication Data
US 2021/0091389 A1    Mar. 25, 2021

(30) Foreign Application Priority Data
Sep. 23, 2019  (DE) .......................... 102019214501.9

(51) Int. Cl.
*H01M 8/0247* (2016.01)
*H01M 8/0206* (2016.01)
*H01M 8/0228* (2016.01)
*H01M 8/0258* (2016.01)

(52) U.S. Cl.
CPC ....... *H01M 8/0247* (2013.01); *H01M 8/0206* (2013.01); *H01M 8/0228* (2013.01); *H01M 8/0258* (2013.01)

(58) Field of Classification Search
CPC ............ H01M 8/0247; H01M 8/0206; H01M 8/0228; H01M 8/0258; H01M 2008/1095; H01M 8/0267; H01M 8/0297; H01M 8/0254; H01M 8/0232; H01M 8/0245; H01M 8/04126; Y02E 60/50; G01B 11/14
See application file for complete search history.

(56) References Cited

U.S. PATENT DOCUMENTS

2004/0151975 A1* 8/2004 Allen .................. H01M 8/0206
                                                          72/379.6

FOREIGN PATENT DOCUMENTS

| DE | 102012002053 A1 | 8/2012 |
| DE | 202015102771 U1 | 10/2016 |
| JP | 2005190946 A | 7/2005 |
| JP | 2005-235555 * | 9/2005 | ............. H01M 8/02 |

* cited by examiner

*Primary Examiner* — Helen Oi K Conley
(74) *Attorney, Agent, or Firm* — McCoy Russell LLP

(57) ABSTRACT

A separator plate assembly for an electrochemical system, comprising a first metal sheet and a second metal sheet, which are in contact with one another at least in areas along the flat sides thereof facing one another, the first metal sheet including a first through-hole, or a group of first through-holes, and a first embossed structure surrounding the first through-hole, or the group of first through-holes, of the first metal sheet, and the second metal sheet including a first embossed structure, which is arranged at least in sections in an area of the second metal sheet that is defined by a perpendicular projection of the first through-hole, or of the group of first through-holes, of the first metal sheet onto the second metal sheet.

15 Claims, 11 Drawing Sheets

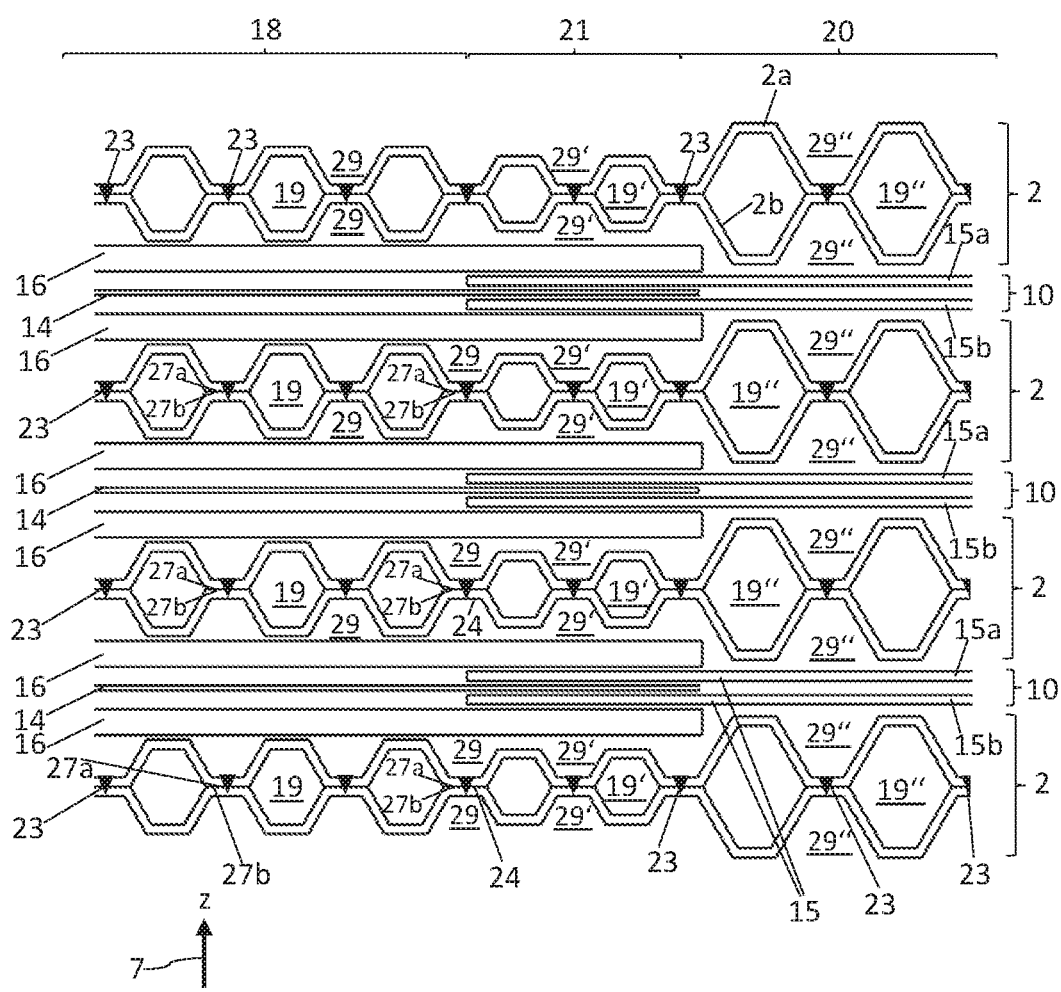
FIG. 3 (A-A)

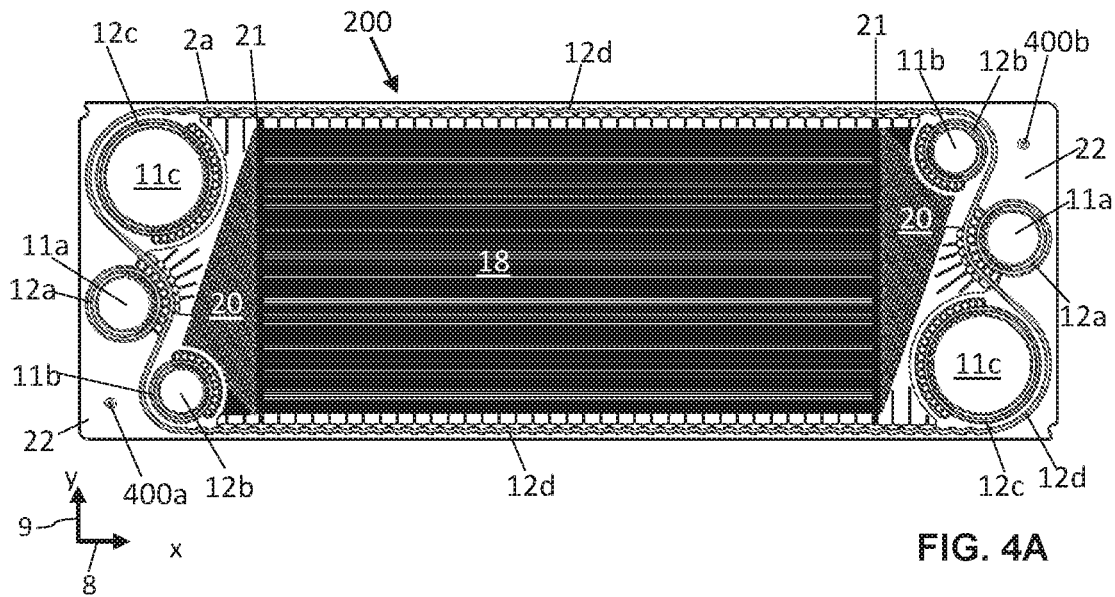
FIG. 4A
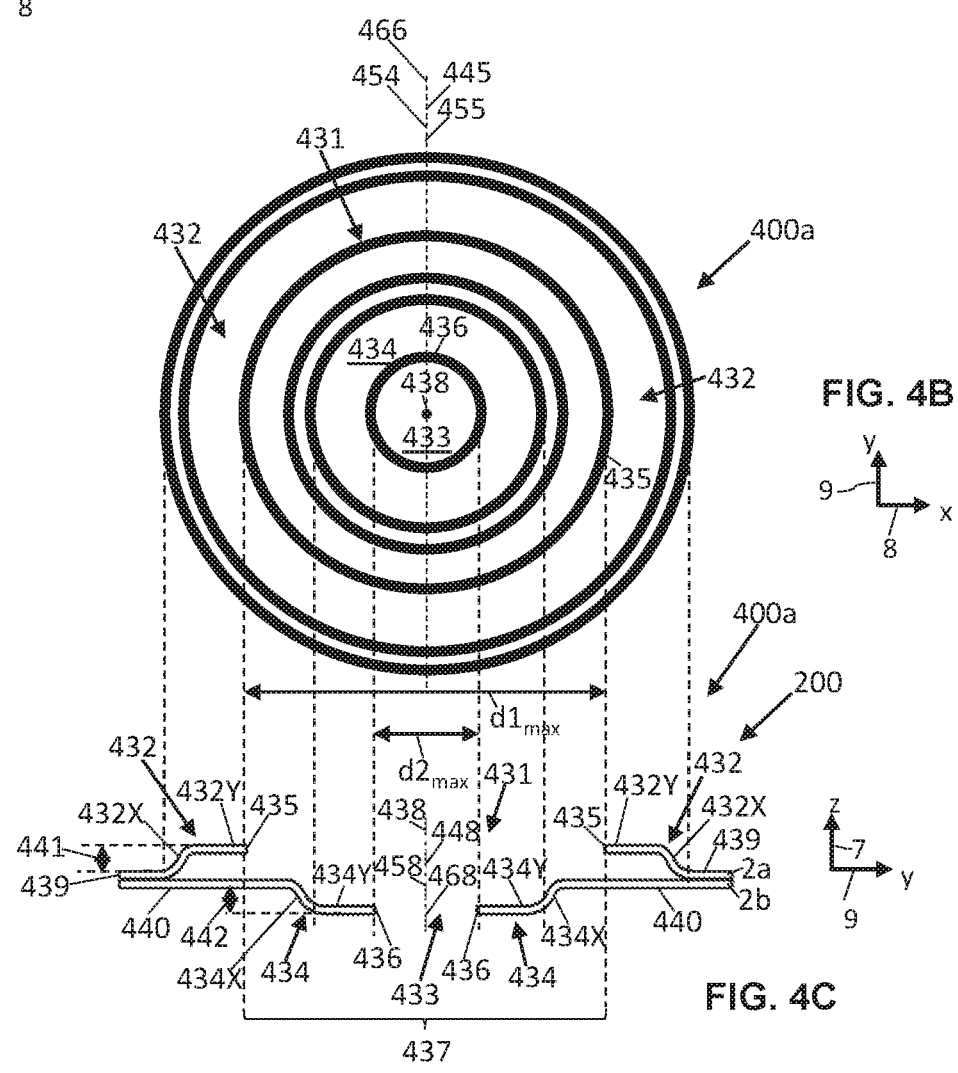
FIG. 4B
FIG. 4C (B-B)

SEPARATOR PLATE ARRANGEMENT FOR AN ELECTROCHEMICAL SYSTEM

CROSS-REFERENCE TO RELATED APPLICATIONS

The present application claims priority to German Patent Application No. 10 2019 214 501.9, entitled "SEPARATOR PLATE ARRANGEMENT FOR AN ELECTROCHEMICAL SYSTEM", and filed on Sep. 23, 2019. The entire contents of the above-listed application are hereby incorporated by reference for all purposes.

TECHNICAL FIELD

The present document primarily relates to a separator plate assembly for an electrochemical system comprising a first metal sheet and a second metal sheet.

BACKGROUND AND SUMMARY

Known electrochemical systems, for example fuel cell systems or electrochemical compressor systems, such as electrolyzers, conventionally comprise a stack of electrochemical cells, which are each separated from one another by metal separator plates. These separator plates are often formed as bipolar plates. These separator plates or bipolar plates conventionally comprise two joined individual metal plates, which are typically welded together and are normally made of thin metal sheets. As a result, each separator plate or bipolar plate then comprises a first metal sheet and a second metal sheet. The separator plates, or the individual plates forming the separator plates, may be used, e.g., for the electrical contacting of the electrodes of the individual electrochemical cells (e.g., fuel cells) and/or for the electrical connection of adjacent cells (series connection of the cells).

The separator plates, or the individual plates or metal sheets forming the separator plates, may include a channel structure, which is configured to supply the cells with one or more media and/or to remove reaction products. The media may be fuels (e.g., hydrogen or methanol), reaction gases (e.g., air or oxygen) or coolants, for example. Such a channel structure is customarily arranged in an electrochemically active area (gas distribution structure/flow field). Moreover, the separator plates, or the individual plates or metal sheets forming the separator plates, may be configured to transfer the waste heat that arises during the conversion of electric or chemical energy in the electrochemical cell, and to seal the different media and/or channels with respect to one another and/or with respect to the outside. The aforementioned channel structures and/or sealing structures, in particular sealing beads, are customarily embossed into the individual plates using an embossing tool. Similar structures are also present in separator plates of humidifiers for electrochemical systems. What is described hereafter may also apply accordingly to separator plates for humidifiers.

It is known to provide each of the individual plates or the separator plates with one or more measuring structures. These are structures that are formed at or on the plates and detectable by way of an optical sensor and that, using a pattern or image recognition software, are used to establish a coordinate system aligned relative to the plate in a defined manner. This coordinate system is used, for example, for measuring the plate, for automatically positioning the plate in a tool or for measuring structures embossed into the plate or structures applied onto the plate. The tool in which the plate may be positioned in a defined manner by way of the measuring structures may, e.g., be a joining tool, a coating device or a cutting device, and in particular a stamping or laser cutting device. Some process steps may be carried out in a defined position based on the measurement relative to such a measuring structure: e.g., positioning of the laser welding seams, positioning of the screen printing for partial coating etc.

A measuring structure of the type in question is known, e.g., from the published prior art DE102012002053A1, which is referred to as a measuring feature there. In a particular embodiment, the measuring feature according to DE102012002053A1 is a substantially circular depression, which is arranged in a raised section on the plate. Using known optical measuring systems, such rounded depressions may be easily localized, and the centers thereof ascertained. An optical measuring system for localizing this measuring structure comprises, e.g., a light source for illuminating the measuring structure, and an image detector for recording an image of the plate having the measuring structure arranged on the plate, wherein the light source and the camera may be arranged on the same side of the plate (reflected light method).

DE202015102771U1 relates to a metal plate for an electrochemical system including a measuring structure formed integrally with the plate. The measuring structure has at least two cuts in the plate, and a first deformation of the plate that is arranged between the cuts and delimited in sections by the cuts, wherein the cutting edges of the cuts spaced apart from one another in sections by the first deformation form at least two windows in the plate. The measuring structure furthermore has at least one second deformation of the plate. The plate is deformed by the second deformation in the area of the plate abutting the windows in such a way that the windows allow light incident on the plate to pass through perpendicularly to the planar surface plane of the plate. So as to localize this measuring structure, transmitted light processes must be used, in which the light source and the image detector are arranged on different sides of the plate, so that the light emitted by the light source typically passes through the window in the plate perpendicularly to the planar surface plane of the plate, and is detected on the opposite side of the plate by the image detector.

During the steps necessary for producing a separator plate or a bipolar plate from two metal sheets, however, a multitude of further inaccuracies may occur. Typically, at least two different tools are conventionally used during the processing of each of the individual plates of a separator plate, e.g., an embossing tool for deforming the individual plate in areas, and a stamping tool for introducing through-openings into the individual plate. When the individual plate is not optimally positioned in at least one of the tools, this may consequently cause a relative alignment of the embossed structures of this individual plate with respect to the stamped structures of the same individual plate to deviate from an ideal relative alignment. As an alternative or in addition, assembly errors may occur when joining a first individual plate or a first metal sheet to a second individual plate or to a second metal sheet when a relative alignment of the two individual plates or metal sheets to be joined in the joining tool deviates from an ideal relative alignment in the joining tool.

The aforementioned assembly errors, however, are often not detectable and/or correctable with sufficiently high accuracy by the introduction of measuring structures of the type known thus far. Moreover, measuring structures of the type known thus far may at times be time-consuming and/or expensive to introduce into a separator plate.

It is thus an object of the present invention to create a separator plate assembly that is suitable for use in an electrochemical system and that comprises a first metal sheet, a second metal sheet and at least one measuring structure. The measuring structure is to make it possible to render as large a multitude of assembly inaccuracies as possible detectable and/or correctable, which may occur during the production of the separator plate assembly. Moreover, the separator plate assembly including the measuring structure is to be producible as easily and cost-effectively as possible. Furthermore, the invention is to provide a method for producing such a separator plate assembly.

This object is achieved by a separator plate assembly for an electrochemical system according to claim 1 or claim 4, and by a method for producing a separator plate assembly.

In a first variant, a separator plate assembly for an electrochemical system is thus provided, comprising a first metal sheet and a second metal sheet, which are in contact with one another at least in areas along the flat sides thereof facing one another, wherein the first metal sheet includes a first through-hole, or a group of first through-holes, and a first embossed structure surrounding the first through-hole, or the group of first through-holes, and wherein the second metal sheet, in turn, includes a first embossed structure, which is arranged at least in sections in an area of the second metal sheet that is defined by a perpendicular projection of the first through-hole, or of the group of first through-holes, of the first metal sheet onto the second metal sheet. The first embossed structure and the first through-hole, or the group of first through-holes, of the first metal sheet, as well as the first embossed structure of the second metal sheet form a first measuring structure of the separator plate assembly.

As an alternative, in a second variant, a separator plate assembly for an electrochemical system is provided, comprising a first metal sheet and a second metal sheet, in which the two metal sheets are likewise in contact with one another at least in areas along the flat sides thereof facing one another, wherein the first metal sheet includes a first embossed structure and a group of first through-holes surrounding the first embossed structure, and wherein the second metal sheet includes a first embossed structure, which is arranged at least in sections in an area of the second metal sheet which is defined by a perpendicular projection of the group of first through-holes of the first metal sheet onto the second metal sheet.

The separator plate assembly described here, in both variants, is suitable to a high degree for rendering inaccuracies during the production of the separator plate assembly easily and quickly detectable and correctable. For example, an arrangement and/or an alignment of the first embossed structure of the first metal sheet relative to the first through-hole, or to the group of first through-holes, of the first metal sheet may render an offset between embossed and stamped structures of the first metal sheet visible. Likewise, an arrangement and/or an alignment of the first embossed structure of the first metal sheet and/or of the first through-hole, or of the group of first through-holes, of the first metal sheet relative to the first embossed structure of the second metal sheet may render an offset between embossed and/or stamped structures of the first metal sheet on the one hand, and embossed structures of the second metal sheet on the other hand, detectable and correctable, and more particularly, preferably already before the first and second metal sheets are joined. So as to identify the arrangement of the first embossed structure and of the first through-hole, or of the group of first through-holes, of the first metal sheet and of the second embossed structure of the second metal sheet, and so as to align the second embossed structure relative to the first embossed structure, or to the first through-hole, or to the group of first through-holes, of the first metal sheet, it is possible, for example, to use known imaging and image recognition methods.

In both variants, the first embossed structure of the first metal sheet may be raised entirely, or at least partially, above the first sheet plane, and in particular above the surface of the first metal sheet which faces away from the second metal sheet, in a direction facing away from the second metal sheet perpendicular to a first sheet plane defined by the first metal sheet. The first embossed structure of the first metal sheet may include a full bead and/or a semi-bead. Usually, however, no sealing function is associated with this type of bead.

In the first variant, the first embossed structure of the first metal sheet may include an embossed structure that completely encloses the first through-hole, or the group of first through-holes, of the first metal sheet. This is particularly easy when only a single first through-hole is present in the first metal sheet. The first embossed structure of the first metal sheet may also encompass a plurality of sub-structures. These sub-structures may be arranged around the first through-hole, or the group of first through-holes, of the first metal sheet. A group of first through-holes of the first metal sheet then encompasses the through-holes surrounded by the first embossed structure or the sub-structures of the first embossed structure of the first metal sheet.

In the second variant, the first embossed structure of the second metal sheet may encompass an embossed structure completely enclosing the first embossed structure of the first metal sheet. The first embossed structure of the second metal sheet may also encompass a plurality of sub-structures, which are arranged around the first embossed structure of the first metal sheet.

Apart from the area in which it rises out of the sheet plane, the first embossed structure of the first metal sheet may have a constant height, or the sub-structures of the first embossed structure of the first metal sheet may each have the same maximum height, wherein the respective height is determined perpendicularly to a first sheet plane defined by the first metal sheet.

The first metal sheet may also include further embossed structures. These further embossed structures of the first metal sheet may encompass structures for guiding media along the first metal sheet and/or at least one sealing bead and/or at least one closed sealing bead for sealing an electrochemically active area of the first metal sheet. The first through-hole, or the group of first through-holes, of the first metal sheet may then be arranged outside the closed sealing bead of the first metal sheet. A maximum height of the first embossed structure of the first metal sheet may be smaller than a maximum height of the further embossed structures, or than an average height of the further embossed structures. For example, the maximum height of the first embossed structure of the first metal sheet may be smaller than a maximum height, or than an average height, of a sealing bead embossed into the first metal sheet, and more particularly also in the intended pressed state of the sealing bead of the first metal sheet, so that the first embossed structure of the first metal sheet itself is not pressed. The height of the first embossed structure of the first metal sheet and of the further embossed structure of the first metal sheet, and in particular of the sealing bead of the first metal sheet embossed into the first metal sheet, is preferably determined in each case perpendicularly to a first sheet plane defined by the first metal sheet, and in particular to the neutral fiber of the first metal sheet, or to one of the surfaces thereof.

The first embossed structure of the first metal sheet may be spaced apart from the first through-hole, or the group of first through-holes, or an envelope around the group of first through-holes, of the first metal sheet. The distances may already vary circumferentially around the through-hole with an ideal positioning of the embossed structure and the through-hole with respect to one another, that is, without any offset. This is in particular the case when at least the first embossed structure of the first metal sheet, or the first through-hole, or an envelope of the group of first through-holes, of the first metal sheet does not have a continuous rotational symmetry. The distance is always determined at the point or points having the smallest distance between the embossed structure and the edge of the through-hole. A maximum distance between the first embossed structure of the first metal sheet and the at least one first through-hole of the first metal sheet may then, for example, be smaller than or equal to a maximum diameter of the at least one first through-hole of the first metal sheet. For a maximum diameter dmax of the first through-hole, or of a through-hole of the group of first through-holes, of the first metal sheet, the following may apply: 1.0 mm≤dmax≤10 mm, and preferably 1.5 mm≤dmax≤8 mm.

The first embossed structure of the first metal sheet may be symmetrical. For example, the first embossed structure of the first metal sheet may be mirror-symmetrical with respect to a mirror plane. This mirror plane may then be situated perpendicularly on a first sheet plane defined by the first metal sheet. The mirror plane of the first embossed structure of the first metal sheet may extend through the first through-hole, or the group of first through-holes, of the first metal sheet, and preferably through a centroid of an area defined by the first through-hole, or by the envelope around the group of first through-holes, of the first metal sheet.

The first embossed structure of the first metal sheet may be rotation-symmetrical with respect to an axis of symmetry, wherein this axis of symmetry may be situated perpendicularly on a first sheet plane defined by the first metal sheet. The axis of symmetry of the first embossed structure of the first metal sheet may, e.g., extend through the first through-hole, or the group of first through-holes, of the first metal sheet, and preferably through a centroid of an area defined by the first through-hole, or by the envelope around the group of first through-holes, of the first metal sheet.

The first embossed structure of the first metal sheet may possess discrete rotational symmetry with respect to the axis of symmetry thereof, e.g., n-fold rotational symmetry, wherein n is a natural number, and wherein n≥2, preferably n≥3, and particularly preferably n≥4 applies. The first embossed structure of the first metal sheet may also possess continuous rotational symmetry with respect to the axis of symmetry thereof.

The first embossed structure of the first metal sheet may thus, in particular, be circular. However, it may also be polygonal, and in particular triangular or quadrangular having rounded ends, if necessary also including indentations. Oval, elliptical, elongated hole or crescent shapes of the first embossed structure are likewise possible. In all these shapes, semi-bead or solid-bead cross-sections are possible on one side of the first through-hole, depending on the installation space. An unambiguous centroid may advantageously be ascertained for the first embossed structure, wherein this is located in an orthogonal projection in the area of the first through-hole, or of the envelope of the first through-holes, of the first metal sheet onto the second metal sheet. If the first embossed structure is composed of sub-structures, the sub-structures may be circular, oval, elliptical, elongated hole-shaped or crescent-shaped. A full bead shape, in the cross-sectional view, often arises on one side of a single first through-hole. It is possible to combine different sub-structures in the first embossed structure. If the first embossed structure is composed of sub-structures, the centroids of the sub-structures are ascertained, and, in turn, the center is formed from these centroids.

A first through-hole edge defining and surrounding the first through-hole of the first metal sheet, or an envelope of the group of first through-holes of the first metal sheet, may be symmetrical. The first through-hole edge, or the envelope of the group of first through-holes, of the first metal sheet is then typically part of the first measuring structure of the separator plate assembly. The first through-hole edge, or the envelope of the group of first through-holes, of the first metal sheet may, for example, be formed to be mirror-symmetrical with respect to a mirror plane, wherein this mirror plane may be situated perpendicularly on a first sheet plane defined by the first metal sheet. The first through-hole edge, or the envelope of the group of first through-holes, of the first metal sheet may be rotation-symmetrical with respect to an axis of symmetry, wherein this axis of symmetry may then be situated perpendicularly on a first sheet plane defined by the first metal sheet. The first through-hole edge, or the envelope of the group of first through-holes, of the first metal sheet may possess discrete rotational symmetry with respect to the axis of symmetry thereof, for example k-fold rotational symmetry, wherein k is a natural number, and wherein k≥2, preferably k≥3, and particularly preferably k≥4 applies. The first through-hole edge, or the envelope of the group of first through-holes, of the first metal sheet may also possess continuous rotational symmetry with respect to the axis of symmetry thereof.

The at least one first through-hole of the first metal sheet may thus, in particular, be circular. However, it may also be polygonal, and in particular triangular or quadrangular having rounded ends, if necessary also including indentations. Oval, elliptical, elongated hole or crescent shapes of the first through-hole are likewise possible. The aforementioned shapes are also possible for individual or all through-holes of a group of first through-holes, wherein it is preferred when all through-holes of the group of first through-holes have an identical shape.

An axis of symmetry of the first embossed structure of the first metal sheet may coincide with an axis of symmetry of the first through-hole edge, or of the envelope of the group of first through-holes, of the first metal sheet, or a smallest distance between these axes of symmetry may be smaller than a maximum distance. As an alternative or in addition, a mirror plane of the first embossed structure of the first metal sheet may coincide with, or intersect, a mirror plane of the first through-hole edge, or of the envelope of the group of first through-holes, of the first metal sheet, or a smallest distance between these mirror planes may be smaller than a maximum distance.

The first embossed structure of the second metal sheet may extend along a closed line. The first embossed structure of the second metal sheet may also encompass a plurality of sub-structures. The first embossed structure of the second metal sheet may be entirely, or at least partially, raised above a second sheet plane defined by the second metal sheet. The first embossed structure of the second metal sheet may be entirely, or at least partially, raised above the second sheet plane in a direction facing away from the first metal sheet, perpendicular to the second sheet plane. The first embossed structure of the second metal sheet may be entirely, or at least partially, raised above the second sheet plane in a direction facing the first metal sheet, perpendicular to the second sheet plane. When the first embossed structure of the second metal sheet is raised above the second sheet plane in the direction facing the first metal sheet, it may also be raised at least in areas above a first sheet plane defined by the first metal sheet and/or extend through the first through-hole, or at least one through-hole of the group of first through-holes, of the first metal sheet.

The second metal sheet may, in turn, include a first through-hole. The first through-hole of the second metal sheet is then typically part of the first measuring structure of the separator plate assembly. The first embossed structure of the second metal sheet may be arranged around the first through-hole of the second metal sheet. If the first embossed structure of the second metal sheet includes sub-structures, these may be arranged around the first through-hole of the second metal sheet. The first embossed structure of the second metal sheet may enclose the first through-hole of the second metal sheet. Likewise, however, it is also possible, when first embossed structure of the second metal sheet includes sub-structures, for one, more or all of these sub-structures to include a first through-hole, that is, a first through-hole of the second metal sheet. The first embossed structure of the second metal sheet may be spaced apart from the first through-hole of the second metal sheet.

Apart from the area in which it rises out of the sheet plane, the first embossed structure of the second metal sheet may have a constant height, or the sub-structures of the first embossed structure of the second metal sheet may each have the same maximum height, wherein the respective height is determined perpendicularly to a second sheet plane defined by the second metal sheet. For example, the first embossed structure of the second metal sheet may include a full bead and/or a semi-bead.

The second metal sheet may also include further embossed structures. These further embossed structures of the second metal sheet may encompass structures for guiding media along the second metal sheet and/or at least one closed sealing bead for sealing an electrochemically active area of the second metal sheet. The first embossed structure of the second metal sheet may then be arranged outside the closed sealing bead of the second metal sheet. A maximum height of the first embossed structure of the second metal sheet may be smaller than a maximum height of the further embossed structures, or than an average height of the further embossed structures of the second metal sheet. For example, the maximum height of the first embossed structure of the second metal sheet may be smaller than a maximum height, or than an average height, of a sealing bead embossed into the second metal sheet, and more particularly also in the intended pressed state of the sealing bead of the second metal sheet, so that the first embossed structure of the second metal sheet itself is not pressed. The height of the first embossed structure of the second metal sheet and of the further embossed structure of the second metal sheet, and in particular of the sealing bead of the second metal sheet embossed into the second metal sheet, is preferably determined in each case perpendicularly to a second sheet plane defined by the second metal sheet.

The first embossed structure of the second metal sheet may be symmetrical. For example, the first embossed structure of the second metal sheet may be mirror-symmetrical with respect to a mirror plane, wherein this mirror plane may be situated perpendicularly on a second sheet plane defined by the second metal sheet. The first embossed structure of the second metal sheet may also be rotation-symmetrical with respect to an axis of symmetry, wherein this axis of symmetry may be situated perpendicularly on a second sheet plane defined by the second metal sheet. The first embossed structure of the second metal sheet may possess discrete rotational symmetry with respect to the axis of symmetry thereof, e.g., 1-fold rotational symmetry, wherein 1 is a natural number, and wherein 1≥2, preferably 1≥3, and particularly preferably 1≥4 applies. The first embossed structure of the second metal sheet may also possess continuous rotational symmetry with respect to the axis of symmetry thereof.

The first embossed structure of the second metal sheet may thus, in particular, be circular. However, it may also be polygonal, and in particular triangular or quadrangular having rounded ends, if necessary also including indentations. Oval, elliptical, elongated hole or crescent shapes of the first through-hole are likewise possible. If the first embossed structure is composed of sub-structures, the sub-structures may be circular, polygonal having rounded corners, oval, elliptical, elongated hole-shaped or crescent-shaped.

An axis of symmetry of the through-hole edge of the first through-hole, or of the envelope of the group of first through-holes, of the first metal sheet may coincide with an axis of symmetry of the first embossed structure of the second metal sheet, or a smallest distance between these axes of symmetry may be smaller than a maximum distance. As an alternative or in addition, a mirror plane of the through-hole edge of the first through-hole, or of the envelope of the group of first through-openings, of the first metal sheet may coincide with or intersect a mirror plane of the first embossed structure of the second metal sheet, or a smallest distance between these mirror planes may be smaller than a maximum distance.

In particular in the case of a first embossed structure of the second layer which is composed of sub-structures, it is possible that the first embossed structure is, or the sub-structures thereof are, located only in sections in the area that results during an orthogonal projection of the first through-hole, or of the group of first through-holes, of the first metal sheet onto the second metal sheet. So as to ascertain the centroid or the axis/axes of symmetry or plane/planes of symmetry, the envelope around the sections of the sub-structure which are located in this area is then considered here.

An axis of symmetry of the first embossed structure of the first metal sheet may coincide with an axis of symmetry of the first embossed structure of the second metal sheet, or a smallest distance between these axes of symmetry may be smaller than a maximum distance. As an alternative or in addition, a mirror plane of the first embossed structure of the first metal sheet may coincide with or intersect a mirror plane of the first embossed structure of the second metal sheet, or a smallest distance between these mirror planes may be smaller than a maximum distance.

A first through-hole edge of the second metal sheet defining and surrounding the first through-hole of the second metal sheet may be symmetrical. The first through-hole edge of the second metal sheet is then typically part of the first measuring structure of the separator plate assembly. The first through-hole edge of the second metal sheet may, for example, be mirror-symmetrical with respect to a mirror plane, wherein this mirror plane may be situated perpendicularly on a second sheet plane defined by the second metal sheet. The first through-hole edge of the second metal sheet may also be rotation-symmetrical with respect to an axis of symmetry, wherein this axis of symmetry may then be situated perpendicularly on a second sheet plane defined by the second metal sheet. The first through-hole edge of the second metal sheet may possess discrete rotational symmetry with respect to the axis of symmetry thereof, for example, m-fold rotational symmetry, wherein m is a natural number, and wherein m≥2, preferably m≥3, and particularly preferably m≥4 applies. The first through-hole edge of the second metal sheet may also possess continuous rotational symmetry with respect to the axis of symmetry thereof.

An axis of symmetry of the through-hole edge of the first through-hole of the second metal sheet may coincide with an axis of symmetry of the first embossed structure of the second metal sheet, or a smallest distance between these axes of symmetry may be smaller than a maximum distance. As an alternative or in addition, a mirror plane of the through-hole edge of the first through-hole of the second metal sheet may coincide with or intersect a mirror plane of the first embossed structure of the second metal sheet, or a smallest distance between these mirror planes may be smaller than a maximum distance.

For a maximum diameter dmax of the first through-hole of the second metal sheet, the following may apply: 0.5 mm≤dmax≤5 mm. The first through-hole is smaller than the first embossed structure of the second metal sheet in the process. The first through-hole of the second metal sheet may in particular be circular, this applying in particular to maximum diameters dmax≤1.0 mm.

The first metal sheet and the second metal sheet may be connected to one another, preferably integrally. The first metal sheet and the second metal sheet may be welded to one another, preferably by one or more laser welded connections.

The first metal sheet may additionally include a second through-hole, or a group of second through-holes, and a second embossed structure surrounding the second through-hole, or the group of second through-holes, of the first metal sheet, and the second metal sheet may include a second embossed structure, which is arranged in an area of the second metal sheet defined by a perpendicular projection of the second through-hole, or of the group of second through-holes, of the first metal sheet onto the second metal sheet. As an alternative, the first metal sheet may additionally include a second embossed structure and a group of second through-holes surrounding the second embossed structure, and the second metal sheet may include a second embossed structure, which is arranged in an area of the second metal sheet defined by a perpendicular projection of the group of second through-holes of the first metal sheet onto the second metal sheet.

The second embossed structure and the second through-hole, or the group of second through-holes, of the first metal sheet, together with the second embossed structure of the second metal sheet, form a second measuring structure of the separator plate assembly. The second metal sheet may, in turn, include a second through-hole, wherein the second embossed structure of the second metal sheet may be arranged around the second through-hole of the second metal sheet. The second through-hole of the second metal sheet is then typically part of the second measuring structure of the separator plate assembly. The second measuring structure of the separator plate assembly may be formed corresponding to the first measuring structure of the separator plate assembly.

A first method for producing a separator plate assembly for an electrochemical system, and preferably for producing the above-described separator plate assembly, may comprise the following steps:

stamping out a first through-hole, or a group of first through-holes, from a first metal sheet in a first tool;

embossing a first embossed structure into the first metal sheet in a second tool, wherein the first embossed structure surrounds the first through-hole, or the group of first through-holes, or the group of first through-holes surrounds the first embossed structure, embossing a first embossed structure into a second metal sheet in a third tool; and positioning the first metal sheet and the second metal sheet on top of one another so that the first metal sheet and the second metal sheet are in contact with one another at least in areas along the flat sides thereof facing one another, and the first embossed structure of the second metal sheet is arranged in an area of the second metal sheet that is defined by a perpendicular projection of the first through-hole, or of the group of first through-holes, of the first metal sheet onto the second metal sheet.

The method may furthermore comprise the following steps:

contactlessly detecting a distance between a first reference point and a second reference point, wherein the first reference point is determined based on the first embossed structure of the first metal sheet, and wherein the second reference point is determined based on the first embossed structure of the second metal sheet; and when a deviation of the previously detected distance is not greater than a maximum distance, connecting the first metal sheet to the second metal sheet.

The method may furthermore comprise the following steps:

when the deviation of the previously detected distance between the first reference point and the second reference point is greater than the maximum distance, changing the relative arrangement of the first metal sheet and of the second metal sheet with respect to one another so that the distance between the first reference point and the second reference point is reduced. The relative arrangement of the first metal sheet and of the second metal sheet with respect to one another is preferably changed in the process in such a way that the distance between the first reference point and the second reference point, after the relative arrangement has been changed, is smaller than the maximum distance.

Both in the first method and in the alternative method, the contactless detection of the distance between the first reference point and the second reference point may include illuminating the first embossed structure of the first metal sheet and of the second embossed structure of the second metal sheet using illumination light emitted by a light source, and detecting the illumination light reflected or scattered at the first embossed structure of the first metal sheet and at the first embossed structure of the second metal sheet using a detection device. The light source and the detection device may be arranged on the side of the metal sheets that are positioned on top of one another which faces away from the second metal sheet, so that the illumination light shines through the first through-hole, or the group of first through-holes, of the first metal sheet onto the first embossed structure of the second metal sheet.

Both in the first method and in the alternative method, the determination of the first reference point may include determining a first position of a plane of symmetry or of an axis of symmetry of the first embossed structure of the first metal sheet, and the determination of the second reference point may include determining a second position of a plane of symmetry or an axis of symmetry of the first embossed structure of the second metal sheet. The determination of the distance between the first reference point and the second reference point may then encompass a determination of a distance between the first position and the second position.

An alternative method for producing a separator plate assembly for an electrochemical system, and preferably for producing the above-described separator plate assembly, may comprise the following steps:

cutting out, and in particular stamping out, a first through-hole, or a group of first through-holes, and a second through-hole, or a group of second through-holes, from the first metal sheet in a first tool;

embossing a first embossed structure and a second embossed structure into the first metal sheet in a second tool, wherein the first embossed structure surrounds the first through-hole, or the group of first through-holes, or the group of first through-holes surrounds the first embossed structure, and the second embossed structure surrounds the second through-hole, or the group of second through-holes, or the group of second through-holes surrounds the second embossed structure, and embossing a first embossed structure and a second embossed structure into the second metal sheet in a third tool, and positioning the first metal sheet and the second metal sheet on top of one another so that the first metal sheet and the second metal sheet are in contact with one another at least in areas along the flat sides thereof facing one another, and the first embossed structure of the second metal sheet is arranged in an area of the second metal sheet that is defined by a perpendicular projection of the first through-hole, or of the group of first through-holes, of the first metal sheet onto the second metal sheet, and the second embossed structure of the second metal sheet is arranged in an area of the second metal sheet that is defined by a perpendicular projection of the second through-hole, or of the group of second through-holes, of the first metal sheet onto the second metal sheet.

The alternative method may furthermore comprise the following steps:

contactlessly detecting a distance between a first reference point and a second reference point, wherein the first reference point is determined based on the first embossed structure of the first metal sheet, and wherein the second reference point is determined based on the first embossed structure of the second metal sheet;

contactlessly detecting a distance between a third reference point and a fourth reference point, wherein the third reference point is determined based on the second embossed structure of the first metal sheet, and wherein the fourth reference point is determined based on the second embossed structure of the second metal sheet; and when a deviation of the previously detected distance is not greater than a maximum distance, and a deviation of the previously detected distance between the third reference point and the fourth reference point is not greater than a maximum distance, connecting the first metal sheet to the second metal sheet.

The alternative method may furthermore comprise the following steps:

when the deviation of the previously detected distance between the first reference point and the second reference point is greater than the maximum distance, and/or when the deviation of the previously detected distance between the third reference point and the fourth reference point is greater than the maximum distance, changing the relative arrangement of the first metal sheet and of the second metal sheet with respect to one another so that the distance between the first reference point and the second reference point is reduced and/or the distance between the third reference point and the fourth reference point is reduced. The relative arrangement of the first metal sheet and of the second metal sheet with respect to one another is preferably changed in the process in such a way that both the distance between the first reference point and the second reference point after the relative arrangement has been changed, and the distance between the third reference point and the fourth reference point after the relative arrangement has been changed, are smaller than the maximum distance.

The contactless detection of the distance between the third reference point and the fourth reference point may include illuminating the second embossed structure of the first metal sheet and of the second embossed structure of the second metal sheet using illumination light emitted by a light source, and detecting the illumination light reflected or scattered at the second embossed structure of the first metal sheet and at the second embossed structure of the second metal sheet using a detection device. The light source and the detection device may be arranged on the side of the metal sheets that are positioned on top of one another which faces away from the second metal sheet, so that the illumination light shines through the second through-hole, or the group of second through-holes, of the first metal sheet onto the second embossed structure of the second metal sheet.

The determination of the third reference point may include determining a third position of a plane of symmetry or of an axis of symmetry of the second embossed structure of the first metal sheet, and the determination of the fourth reference point may include determining a fourth position of a plane of symmetry or an axis of symmetry of the second embossed structure of the second metal sheet. The determination of the distance between the third reference point and the fourth reference point may then include a determination of a distance between the third position and the fourth position.

The stamping out of the first through-hole, or of the group of first through-holes, and, if necessary, the stamping out of a second through-hole, or of a group of second through-holes, of the first metal sheet are preferably carried out in the same tool, and in particular in the same stamping step as the stamping out of at least one further through-hole of the first metal sheet and/or of the outer edge thereof. In this way, an offset between the at least one through-hole of the measuring structure and the at least one further through-hole and/or the outer edge is avoided.

The embossing of the first embossed structure, and, if necessary, the embossing of the second embossed structure, of the first metal sheet are preferably carried out in the same tool, and in particular in the same embossing step as the embossing of at least one further embossed structure, for example of the channels of the gas distribution structure of the first metal sheet. In this way, an offset between the first embossed structure, and, if necessary, the second embossed structure, of the measuring structure and the at least one further embossed structure of the first metal sheet is avoided.

The embossing of the first embossed structure, and, if necessary, the embossing of the second embossed structure, of the second metal sheet are preferably carried out in the same tool, and in particular in the same embossing step as the embossing of at least one further embossed structure, for example of the channels of the gas distribution structure of the second metal sheet. In this way, an offset between the first embossed structure, and, if necessary, the second embossed structure, of the measuring structure and the at least one further embossed structure of the second metal sheet is avoided.

The stamping out of the first through-hole, and, if necessary, the stamping out of a second through-hole, of the second metal sheet are preferably carried out in the same tool, and in particular in the same stamping step as the stamping out of at least one further through-hole of the second metal sheet and/or of the outer edge thereof. In this way, an offset between the at least one through-hole of the measuring structure and the at least one further through-hole and/or the outer edge is avoided.

BRIEF DESCRIPTION OF THE FIGURES

Embodiments of an electrochemical system comprising separator plate assemblies of the type described here are shown in the figures and will be described in greater detail based on the following description. In the drawings:

FIG. 3 schematically shows a section through a plate stack of a system in the manner of the system according to FIG. 1;

FIG. 4A schematically shows a top view onto a separator plate including two measuring structures according to a first embodiment;

FIG. 4B schematically shows a detailed view of one of the measuring structures from FIG. 4A;

FIG. 4C schematically shows the measuring structure from FIG. 4B in a sectional illustration;

FIGS. 1-19 are shown approximately to scale.

DETAILED DESCRIPTION

Figure 1:
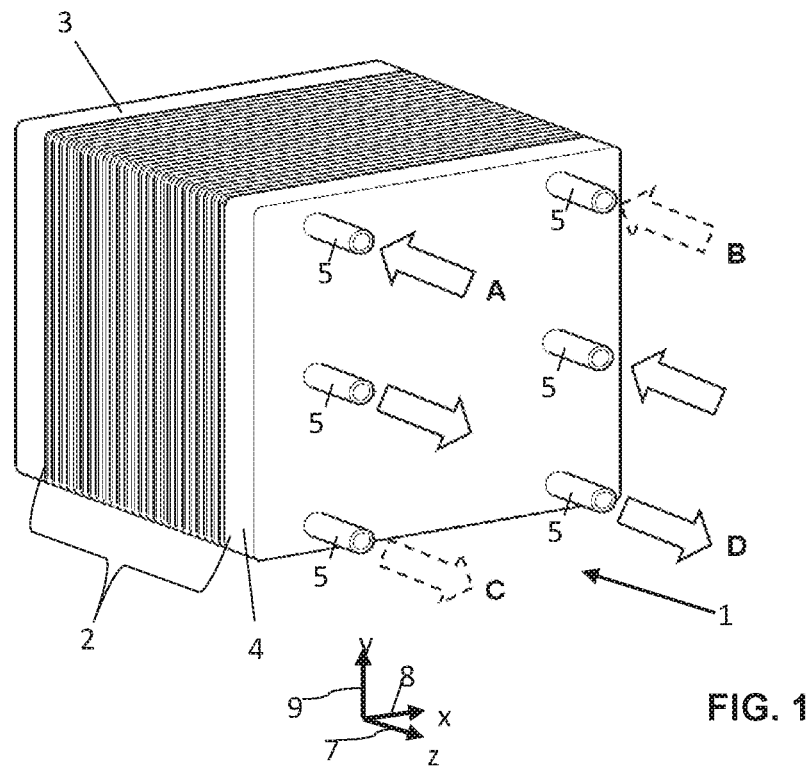
FIG. 1 schematically shows a perspective illustration of an electrochemical system comprising a plurality of separator plates or bipolar plates arranged in a stack.

FIG. 1 shows an electrochemical system 1 comprising a plurality of identical metal separator plates or bipolar plates 2, which are arranged in a stack and stacked along a z direction 7. The separator plates 2 of the stack are clamped between two end plates 3, 4. The z direction 7 is also called the stacking direction. In the present example, the system 1 is a fuel cell stack. Two adjacent separator plates 2 of the stack in each case thus enclose between them an electrochemical cell, which is used, e.g., for converting chemical energy into electrical energy. So as to form the electrochemical cells of the system 1, a respective membrane electrode assembly (MEA) is arranged between adjacent separator plates 2 of the stack (see e.g., FIG. 2). The MEAs typically each contain at least one membrane, e.g., an electrolyte membrane. Furthermore, a gas diffusion layer (GDL) may be arranged on one or both surfaces of the MEA.

In alternative embodiments, the system 1 may likewise be formed as an electrolyzer, an electrochemical compressor, or as a redox flow battery. Separator plates may likewise be used in these electrochemical systems. The composition of these separator plates may then correspond to the composition of the separator plates 2 that are explained in greater detail here, even if the media guided on or through the separator plates in the case of an electrolyzer, in the case of an electrochemical compressor, or in the case of a redox flow battery, may in each case differ from the media used for a fuel cell system. The same applies to the separator plates, in particular of a humidifier.

Together with an x-axis 8 and a y-axis 9, the z-axis 7 spans a right-handed Cartesian coordinate system. The separator plates 2 in each case define a plate plane, wherein the plate planes of the separator plates are each aligned parallel to the x-y plane, and thus perpendicular to the stacking direction or to the z-axis 7. The end plate 4 includes a plurality of media connections 5, via which media are suppliable to the system 1 and via which media are dischargeable out of the system 1. These media that may be supplied to the system 1 and discharged out of the system 1 may, e.g., include fuels such as molecular hydrogen or methanol, reaction gases such as air or oxygen, reaction products such as water vapor, or depleted fuels or coolants such as water and/or glycol.

Figure 2:
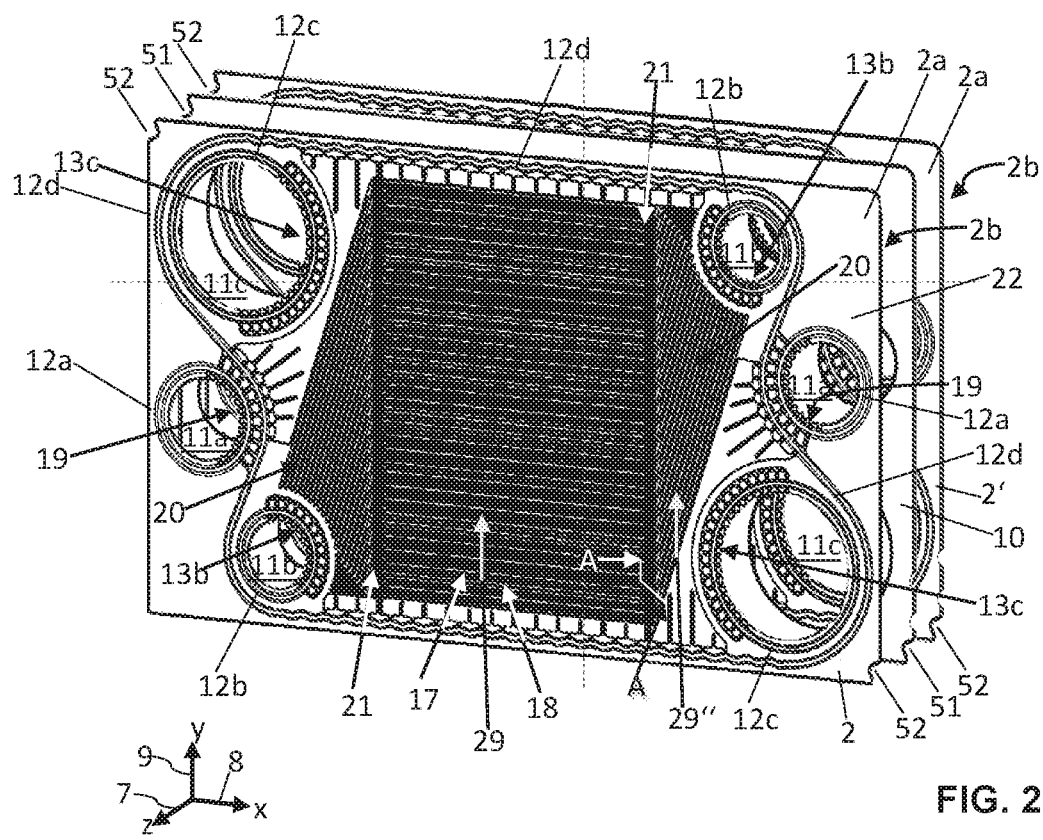
FIG. 2 schematically shows a perspective illustration of two separator plates of the system according to FIG. 1, comprising a membrane electrode assembly (MEA) arranged between the separator plates.

FIG. 2 shows a perspective view of two adjacent separator plates or bipolar plates 2 of an electrochemical system of the type of the system 1 from FIG. 1, as well as a membrane electrode assembly (MEA) 10, which is known from the related art, arranged between these adjacent separator plates 2, wherein the MEA 10 in FIG. 2 is largely hidden by the separator plate 2 facing the observer. Here and hereafter, recurring features are each designated with the same reference numerals in different figures. The separator plate 2 is formed from two integrally joined individual plates 2a, 2b (see e.g., FIG. 3), of which only the first individual plate 2a facing the observer is visible in FIG. 2, which hides the second individual plate 2b. The individual plates 2a, 2b may be made of sheet metal, such as stainless steel sheet. The individual plates 2a, 2b may, e.g., be welded together, e.g., by laser welded connections.

The individual plates 2a, 2b have mutually aligned through-openings, which form through-openings 11a-c of the separator plate 2. When a plurality of separator plates of the type of separator plate 2 are stacked, the through-openings 11a-c form ducts extending through the stack 2 in the stacking direction 7 (see FIG. 1). Typically, each of the ducts formed by the through-openings 11a-c is in fluid connection with one of the ports 5 in the end plate 4 of the system 1. Coolant may, e.g., be introduced into the stack or removed from the stack via the ducts formed by the through-openings 11a. In contrast, the ducts formed by the through-openings 11b, 11c may be configured to supply the electrochemical cells of the fuel cell stack of the system 1 with fuel and with reaction gas, as well as to remove the reaction products from the stack.

So as to seal the through-openings 11a-c with respect to the inside of the stack 2 and with respect to the surroundings, the first individual plates 2a each comprise sealing systems in the form of sealing beads 12a-c, which are each arranged around the through-openings 11a-c and each completely enclose the through-openings 11a-c. On the rear side of the separator plates 2 facing away from the observer of FIG. 2, the second individual plates 2b comprise appropriate sealing beads for sealing the through-openings 11a-c (not shown).

In an electrochemically active area 18, the first individual plates 2a, at the front side thereof facing the observer of FIG. 2, include a flow field 17 including structures for guiding a reaction medium along the front side of the individual plate 2a. These structures are provided in FIG. 2 by a plurality of webs, and channels extending between the webs and delimited by the webs. On the front side of the separator plates 2 facing the observer of FIG. 2, the first individual plates 2a moreover each include a distribution or collection area 20. The distribution or collection area 20 includes structures that are configured to distribute a medium that, proceeding from a first of the two through-openings 11b, is introduced into the distribution or collection area 20 across the active area 18 and/or to collect or to pool a medium that, proceeding from the active area 18, flows toward the second of the through-openings 11b. The distribution structures of the distribution or collection area 20 in FIG. 2 are likewise provided by webs, and channels extending between the webs and delimited by the webs. A respective transition area 21, which in FIG. 2 is aligned parallel to the y direction 9, is located on both sides of the flow field 17 at the transition between the distribution and area 20 and the flow field 17 of the active area 18. In the transition area 21, the media guidance structures in each case have a reduced height, e.g., compared to the adjacent areas 18 and 20 (see FIG. 3).

The first individual plates 2a furthermore comprise a further sealing system in the form of a perimeter bead 12d, which extends around the flow field 17 of the active area 18, the distribution or collection area 20 and the through-openings 11b, 11c and seals these with respect to the through-opening 11a, i.e., with respect to the coolant circuit, and with respect to the surroundings of the system 1. The second individual plates 2b in each case include corresponding perimeter beads. The structures of the active area 18, the distribution structures of the distribution or collection area 20 and the sealing beads 12a-d are each formed in one piece with the individual plates 2a and integrally formed in the individual plates 2a, e.g., in an embossing or deep drawing process. The same applies to the corresponding distribution structures and sealing beads of the second individual plates 2b. Outside the area surrounded by the perimeter bead 12d, a predominantly unstructured outer edge area 22 results in each individual plate 2a, 2b.

The two through-openings 11b or the ducts formed by the through-openings 11b through the plate stack of the system 1 are each in fluid connection with one another via passages 13b in the sealing beads 12b, via the distribution structures of the distribution or collection area 20, and via the flow field 17 in the active area 18 of the first individual plates 2a facing the observer of FIG. 2. Similarly, the two through-openings 11c or the ducts formed by the through-openings 11c through the plate stack of the system 1 are each in fluid connection with one another via corresponding bead passages, via corresponding distribution structures, and via a corresponding flow field on an outer side of the second individual plates 2b facing away from the observer of FIG. 2. In contrast, for example, the through-openings 11a or the ducts formed by the through-openings 11a through the plate stack of the system 1 are each in fluid connection with one another via a cavity 19 that is enclosed or surrounded by the individual plates 2a, 2b. This cavity 19 is used for guiding a coolant through the separator plate 2, and in particular for cooling the electrochemically active area 18 of the separator plate 2.

FIG. 3 schematically shows a sectional view through a section of the plate stack of the system 1 from FIG. 1, wherein the cutting plane is oriented in the z direction, and thus perpendicular to the plate planes of the separator plates 2; for example, it may extend along the bent section A-A in FIG. 2. The identical separator plates 2 of the stack each comprise the above-described first metal individual plate 2a, and the above-described second metal individual plate 2b. Furthermore, the active area 18, the transition area 21 and the distribution or collection area 20 of the separator plates 2 are identified, wherein the areas 18, 21, 20 each include structures for guiding media along the outer surfaces of the separator plates 2, which here in particular each take on the form of webs and channels delimited by the webs. In the active area 18, channels 29 on the surfaces of mutually abutting individual plates 2a, 2b which face away from one another, as well as cooling channels 19 between mutually abutting individual plates 2a, 2b, are shown. Channels 29', 19' are analogously highlighted in the transition area 21, as are channels 29'', 19'' in the distribution or collection area 20. Between the cooling channels 19, 19', 19'', the two individual plates 2a, 2b are located on top of one another in a contact area 24, and are connected there to one another, in the present example this being by way of laser weld seams 23.

A respective membrane electrode assembly (MEA) 10, which is known from the related art, e.g., is arranged between adjacent separator plates 2 of the stack. Each of the MEA 10 comprises a membrane 14, e.g., an electrolyte membrane, and an edge section 15 connected to the membrane 14, which is composed of two edge seals 15a, 15b here. For example, the edge section 15, or the edge seals 15a, 15b, may each be integrally joined to the membrane 14, e.g., by an adhesive bond or by lamination. The edge section 15 is formed from a film material, e.g., from a thermoplastic film material or from a thermoset film material.

The membrane 14 of the MEA 10 extends in each case at least across the active area 18 of the abutting separator plates 2, where it enables a proton transfer via or through the membrane 14. Moreover, the membrane 14 extends at least partially into the transition area 21, but not into the distribution or collection area 20. The edge section 15 of the MEA 10 is used in each case for positioning, attaching and sealing the membrane 14 between the abutting separator plates 2. When the separator plates 2 of the system 1 are clamped in the stacking direction between the end plates 3, 4 (see FIG. 1), the edge section 15 of the MEA 10 may, for example, be pressed between the sealing beads 12a-d of the respective abutting separator plates 2 and/or at least between the perimeter beads 12d of the abutting separator plates 2, so as to fix the membrane 14 between the abutting separator plates 2 in this way.

The edge section 15 covers the respective distribution or collection area 20 of the abutting separator plates 2. As is shown in FIG. 3, the edge section 15 may additionally also completely or at least partially cover the transition area 21 of the abutting separator plates 2, or completely or at least partially extend into the transition area 21 of the abutting separator plates 2 (see FIG. 2). Toward the outside, the edge section 15 may also extend beyond the perimeter bead 12d, where it may abut the outer edge area 22 of the individual plates 2a, 2b (see FIG. 2).

As is shown in FIG. 3, gas diffusion layers 16 may additionally be arranged in the active area 18. The gas diffusion layers 16 allow incident flow of the membrane 14 across as large an area of the surface of the membrane 14 as possible, and may thus improve the proton transfer via the membrane 14. The gas diffusion layers 16 may, e.g., be arranged on both sides of the membrane 14 in the active area 18 between the abutting separator plates 2. The gas diffusion layers 16 may, e.g., be formed from a nonwoven fibrous web or comprise a nonwoven fibrous web.

In the section of the exemplary embodiment shown in FIG. 3, the two metal sheets 2a, 2b are optimally positioned on top of one another. This results in the largest possible contact of the end faces 27a, 27b of the active area 18, which allows particularly easy and permanently stable welding. Additionally, this results in the ideal shape of the cooling channels 19, and thus in optimal cooling. If the end faces 27a, 27b were shifted with respect to one another, this would make welding more difficult, and the coolant would flow differently, whereby only insufficient cooling would take place.

FIG. 4A shows a top view onto a separator plate 200, wherein the viewing direction is oriented along the negative z direction 7. The separator plate 200 according to FIG. 4A may have all the features of the separator plates 2 according to FIGS. 1 and 2. As before, recurring features are designated with the same reference numerals. Similarly to the separator plates 2 according to FIGS. 1 and 2, the separator plate 200 according to FIG. 4A thus comprises two individual plates or metal sheets 2a, 2b. The individual plates or metal sheets 2a, 2b are in contact with one another along the flat sides thereof facing one another, and are connected to one another along the flat sides thereof facing one another. The metal sheets 2a, 2b of the separator plate 200 are preferably integrally joined to one another, preferably by one or more welded connections, e.g., by one or more laser welded connections. And corresponding to the separator plates 2 according to FIGS. 1 and 2, the separator plate 200 according to FIG. 4A may include through-openings 11a-c, bead systems 12a-d, an electrochemically active area 18, a distribution or collection area 20, a transition area 21 arranged between the areas 18 and 20, and an outer edge area 22.

The separator plate 200 according to FIG. 4A differs from the separator plates 2 according to FIGS. 1 and 2 in that the separator plate 200 according to FIG. 4A includes two measuring structures 400a and 400b.

In the embodiment of the separator plate 200 according to FIG. 4A, the two measuring structures 400a, 400b are arranged in two corner areas of the substantially rectangular separator plate 200 which are located diagonally opposite one another. In alternative embodiments, the measuring structures may, of course, also be arranged in other areas of the outer edge area 22 of the separator plate 200 or of the metal sheets 2a, 2b. Naturally, the separator plate 200 may also include more than two measuring structures, e.g., three, four, or more than four, in alternative embodiments.

FIG. 4B shows a detailed illustration of the measuring structure 400a of the separator plate 200 according to FIG. 4A in a top view, wherein, as in FIG. 4A, the viewing direction is oriented along the negative z direction 7. And FIG. 4C shows a sectional view through the measuring structure 400a from FIGS. 4A and 4B, wherein the cutting plane is oriented along the y-z plane and thus parallel to the z direction or stacking direction 7. So as to highlight mutually corresponding structures in FIGS. 4B and 4C, these are at least partially connected to one another by dotted lines in FIGS. 4B and 4C. In the separator plate 200 according to FIGS. 4A-C, the measuring structures 400a, 400b are identically formed, so that the configuration of the measuring structure 400a described hereafter also applies by way of example to the configuration of the measuring structure 400b. In alternative embodiments, the same separator plate 200, however, may also include measuring structures that are formed differently. A use of the distinguishing letters a, b was for the most part dispensed with in the further reference numerals in the figures. Hereafter, however, the further elements are used with these two added distinguishing letters when it comes to the comparison or the interrelationship of the two measuring structures 400a, 400b. The designations 2a, 2b for the two metal sheets are independent of this.

The measuring structure 400a according to FIGS. 4A-C includes a through-hole 431 in the first metal sheet 2a, an embossed structure 432 that surrounds the through-hole 431 and is embossed into the first metal sheet 2a, a through-hole 433 in the second metal sheet 2b, as well as an embossed structure 434 that surrounds the through-hole 433 of the second metal sheet 2b and is embossed into the second metal sheet 2b. The through-hole 431 of the first metal sheet 2a is surrounded and delimited by a through-hole edge 435 of the first metal sheet, and the through-hole 433 of the second metal sheet 2b is surrounded and delimited by a through-hole edge 436 of the second metal sheet 2b.

The through-hole 433 and the embossed structure 434 of the second metal sheet 2b are arranged in an area 437 of the second metal sheet 2b, which is defined by a perpendicular projection of the through-hole 431 of the first metal sheet 2a, or by a perpendicular projection of the through-hole edge 435 surrounding the through-hole 431 of the first metal sheet 2a, onto the second metal sheet 2b. In this way, light that shines through the through-hole 431 of the first metal sheet 2a perpendicularly onto the second metal sheet 2b may illuminate the embossed structure 434 and the through-hole 433 of the second metal sheet 2b, or the through-hole edge 436 of the second metal sheet 2b surrounding the through-hole 433, and the embossed structure 434 as well as the through-hole edge 436 may reflect or scatter the light.

For example, the aforementioned perpendicular projection onto the second metal sheet 2b is a projection perpendicular to a sheet plane 440 of the second metal sheet 2b. The sheet plane 440 of the second metal sheet 2b is, e.g., defined by the non-embossed areas of the second metal sheet 2b, e.g., by those non-embossed areas of the second metal sheet 2b that adjoin the embossed structure 434 of the second metal sheet 2b on a side of the embossed structure 434 of the second metal sheet 2b which faces away from the through-hole 433. Correspondingly, a sheet plane 439 of the first metal sheet 2a may be defined by the non-embossed areas of the first metal sheet 2a, e.g., by those non-embossed areas of the first metal sheet 2a that adjoin the embossed structure 432 of the first metal sheet 2a on a side of the embossed structure 432 of the first metal sheet 2a which faces away from the through-hole 431. In the exemplary embodiment of the separator plate 200 shown in FIGS. 4A-C, the sheet plane 439 of the first metal sheet 2a and the sheet plane 440 of the second metal sheet 2b are each aligned parallel to the x-y plane, and these may extend in the neutral fiber of the respective sheet or on one of the surfaces thereof. In FIG. 4C, the perpendicular projection of the through-hole 431 of the first metal sheet 2a, or of the through-hole edge 435 of the first metal sheet 2a surrounding the through-hole 431, onto the second metal sheet 2b thus takes place along the z direction or stacking direction 7.

The embossed structure 432 of the first metal sheet 2b is preferably embossed into the first metal sheet 2a together with further embossed structures of the first metal sheet 2b in one and the same embossing tool. These further embossed structures of the first metal sheet 2a may, for example, include one or more of the sealing beads 12a-d and/or the media guidance structures may include one or more of the areas 18, 20, 21 of the first metal sheet 2a. Accordingly, the through-hole 431 of the first metal sheet 2a is preferably introduced into the first metal sheet 2a, or stamped out from the first metal sheet 2a, together with further stamped or cut structures of the first metal sheet 2a in one and the same stamping or cutting tool. These further stamped or cut structures of the first metal sheet 2a may, for example, include one or more of the through-openings 11a-c of the first metal sheet 2a. An offset 498 between the center axis 438 of the embossed structure 432 and the center axis 458 of the through-hole 431 of the first metal sheet 2a, shown in FIG. 4D, is then also a measure of an offset between the further embossed structures, and the further stamped or cut structures of the first metal sheet 2a.

And the embossed structure 434 of the second metal sheet 2b is preferably embossed into the second metal sheet 2b together with further embossed structures of the second metal sheet 2b in one and the same embossing tool. These further embossed structures of the second metal sheet 2b may, for example, include one or more of the sealing beads and/or media guidance structures of the second metal sheet 2b, for example media guidance structures in an electrochemically active area, a distribution or collection area or a transition area of the second metal sheet 2b, analogously to the areas 18, 20, 21 of the first metal sheet 2a. Accordingly, the through-hole 433 of the second metal sheet 2b is preferably introduced into the second metal sheet 2b, or stamped out from the second metal sheet 2b, together with further stamped or cut structures of the second metal sheet 2b in one and the same stamping or cutting tool. These further stamped or cut structures of the second metal sheet 2b may, for example, include one or more through-openings of the second metal sheet 2b, for example through-openings of the type of the through-openings 11a-c of the first metal sheet 2a. An offset 499 between the center axis 448 of the embossed structure 434 and the center axis 468 of the through-hole 433 of the second metal sheet 2b is then also a measure of an offset between the further embossed structures, and the further stamped or cut structures of the second metal sheet 2b.

Figure 4D:
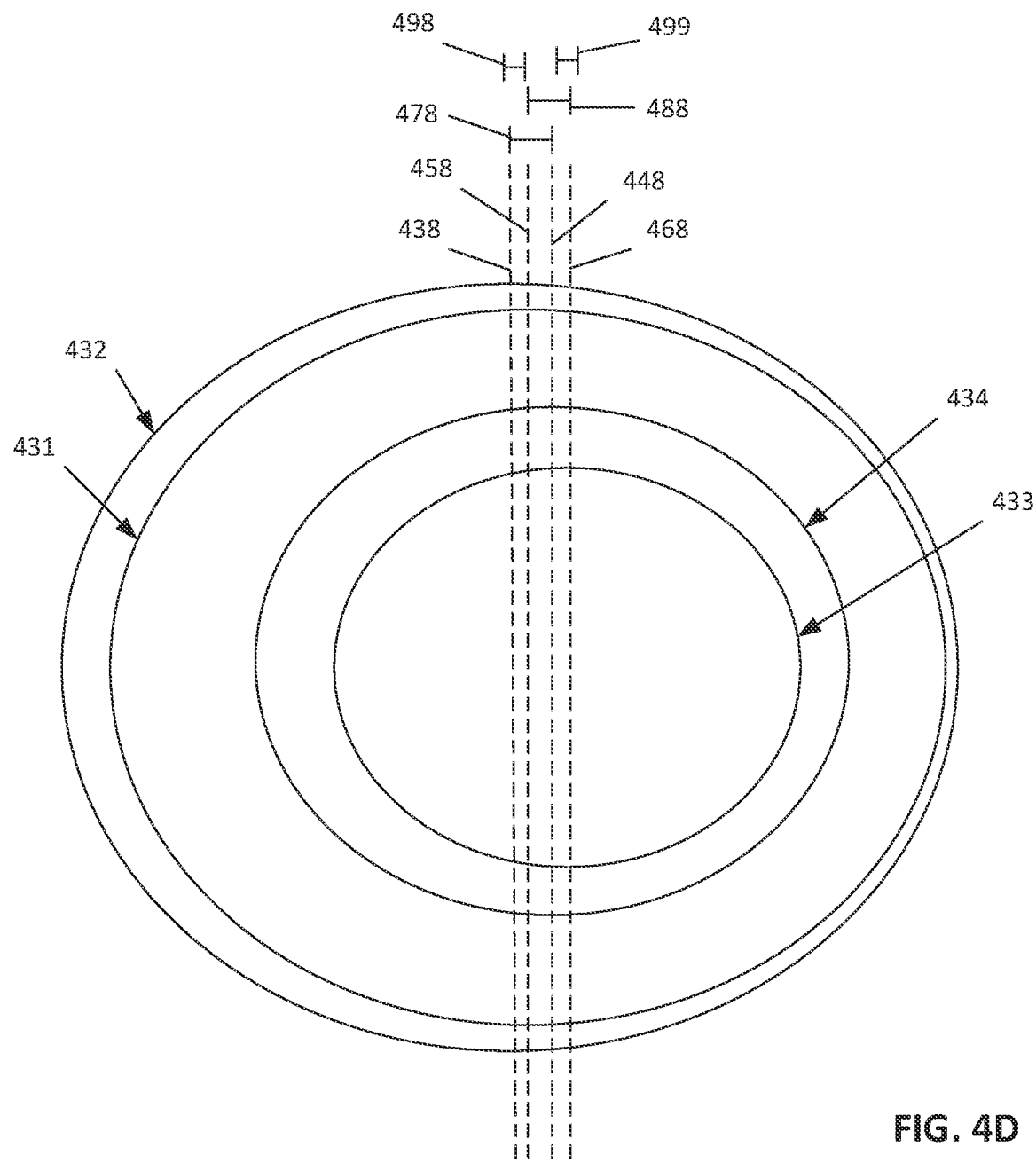
FIG. 4D schematically shows the measuring structure including offset central axes of embossed structures and through-holes.

When the first metal sheet 2a is joined to the second metal sheet 2b, an offset 478 between the center axis 438 of the embossed structure 432 of the first metal sheet 2a and the center axis 448 of the embossed structure 434 of the second metal sheet 2b, shown in FIG. 4D, is then also a measure of an offset between the further embossed structures of the first metal sheet 2a and the further embossed structures of the second metal sheet 2b. And when the first metal sheet 2a is joined to the second metal sheet 2b, an offset 488 between the center axis 458 of the through-hole 431 of the first metal sheet 2a and the center axis 468 of the through-hole 433 of the second metal sheet 2b is then also a measure of an offset between the further stamped or cut structures of the first metal sheet 2a and the further stamped or cut structures of the second metal sheet 2b.

Figure 20:
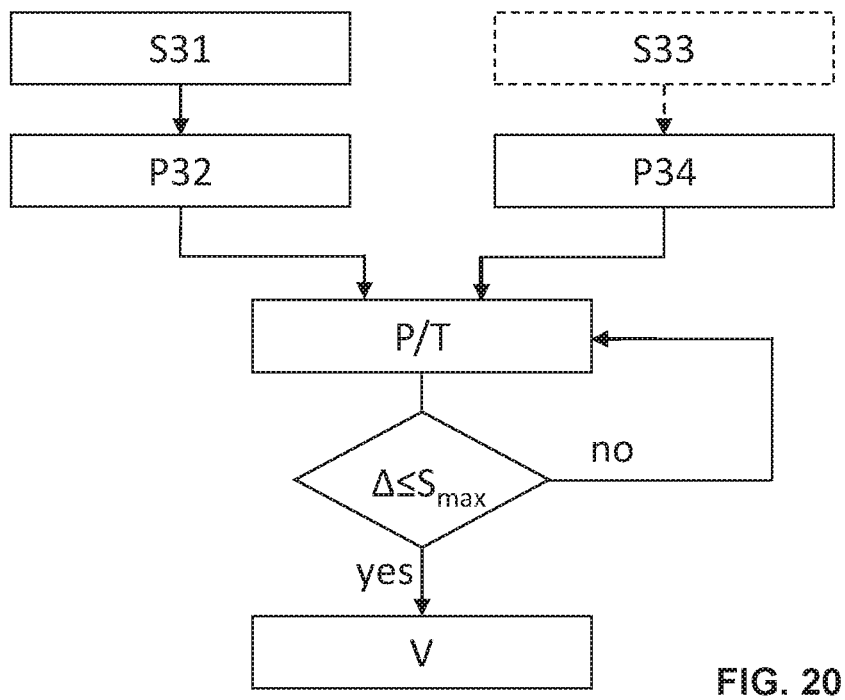
FIGS. 20 to 21 show flow charts of methods according to the invention for producing a separator plate assembly.

A method for producing the separator plate 200 including the measuring structures 400a, 400b according to FIGS. 4A-C, as may also be derived from FIG. 20, may comprise several or all of the following steps, for example:

stamping out (S31) the first through-hole 431 from the first metal sheet 2a in a first stamping tool;

embossing (P32) the first embossed structure 432 of the first metal sheet 2a in a first embossing tool;

stamping out (S33) the first through-hole 433 from the second metal sheet 2b in a second stamping tool; and embossing (P34) the first embossed structure 434 into the second metal sheet 2b in a second embossing tool.

Figure 21:
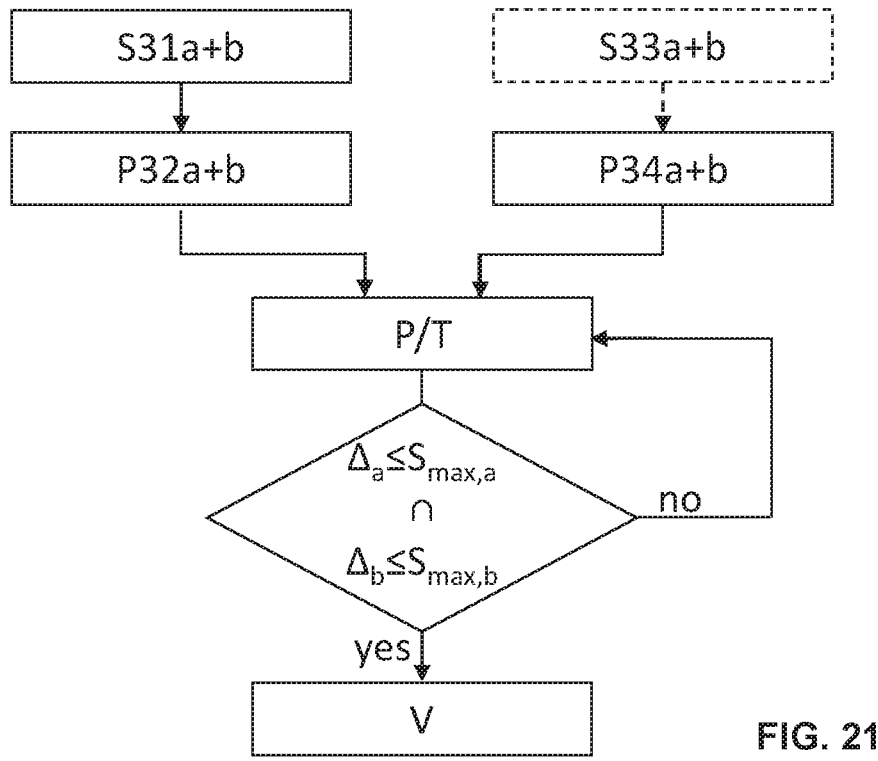

Typically, as is shown in FIG. 21, the corresponding structures of the identical measuring structure 400b are also introduced in a corresponding manner into the first metal sheet 2a and into the second metal sheet 2b, simultaneously with the aforementioned steps:

stamping out (S31a+b) the first through-hole 431a and the second through-hole 431b from the first metal sheet 2a in a first stamping tool;

embossing (P32a+b) the first embossed structure 432a and the second embossed structure 432b of the first metal sheet 2a in a first embossing tool;

stamping out (S33a+b) the first through-hole 433a and the second through-hole 433b from the second metal sheet 2b in a second stamping tool; and embossing (P34) the first embossed structure 434a and the second embossed structure 434b into the second metal sheet 2b in a second embossing tool.

Thereafter, the first metal sheet 2a and the second metal sheet 2b are then positioned (P) on top of one another in such a way that the first metal sheet 2a and the second metal sheet 2b are in contact with one another at least in areas along the flat sides thereof facing one another, and the above-described measuring structures 400a, 400b are formed. So as to form the first measuring structure 400a, the first embossed structure 434 of the second metal sheet 2b is thus arranged in the area 437 of the second metal sheet 2b, which is defined by the perpendicular projection of the through-hole 433 of the first metal sheet 2a onto the second metal sheet 2b. The procedure for forming the second measuring structure 400b may be analogous.

Preferably, the aforementioned further stamped structures of the first metal sheet 2a are also stamped out of the first metal sheet 2a in the first stamping tool. Preferably, the aforementioned further stamped structures of the second metal sheet 2b are also stamped out from the second metal sheet 2b in the second stamping tool. Preferably, the aforementioned further embossed structures of the first metal sheet 2a are also embossed into the first metal sheet 2a in the first stamping tool in the same embossing step as the first embossed structure 432 of the first metal sheet 2a. And preferably, the aforementioned further embossed structures of the second metal sheet 2b are also embossed into the second metal sheet 2b in the second stamping tool in the same embossing step as the first embossed structure 434 of the second metal sheet 2b.

The method for producing the separator plate 200 according to FIGS. 4A-C may include contactlessly detecting (T) a distance between a first reference point and a second reference point, and between a third reference point and a fourth reference point. Exemplary aforementioned reference points are the centers of the aforementioned embossed structures and through-holes.

Using the first measuring structure 400a, the first reference point is determined, e.g., based on the embossed structure 432 and/or based on the through-hole edge 435 of the first metal sheet 2a, and the second reference point is determined, e.g., based on the embossed structure 434 and/or based on the through-hole edge 436 of the second metal sheet 2b. Analogously, the third reference point and the fourth reference point may then be determined using the corresponding embossed structures and/or through-hole edges of the second measuring structure 400b.

If only one measuring structure 400a is considered, the following applies (see also FIG. 20): When a deviation of the previously detected distance between the first reference point and the second reference point (Δ) on the one hand is not greater than a still acceptable maximum distance (Δ≤Smax), the first metal sheet 2a may be connected or joined (V) to the second metal sheet 2b in a joining tool, e.g., by way of laser welding. However, when the deviation of the previously detected distance between the first reference point and the second reference point is greater than the still acceptable maximum distance (Δ>Smax), the relative arrangement of the first metal sheet 2a and of the second metal sheet 2b with respect to one another may be changed in such a way that the distance between the first reference point and the second reference point may be reduced to such an extent that it is smaller than or equal to the still acceptable maximum distance, and thereafter the joining (V) may be carried out.

If two measuring structures 400a, 400b are considered, the following applies (see also FIG. 21): When a deviation of the previously detected distance between the first reference point and the second reference point (Δa) on the one hand, and between the third reference point and the fourth reference point (Δb) on the other hand is not greater than a still acceptable maximum distance (Δa≤Smax,a ∩Δb≤Smax,b), the first metal sheet 2a may be connected or joined to the second metal sheet 2b in a joining tool, e.g., by way of laser welding.

However, when the deviation of at least one of the previously detected distances between the first reference point and the second reference point on the one hand, and between the third reference point and the fourth reference point on the other hand, is greater than the still acceptable maximum distance (Δa>Smax,a ∪Δb>Smax,b), the relative arrangement of the first metal sheet 2a and of the second metal sheet 2b with respect to one another may be changed in such a way that the distance between the first reference point and the second reference point on the one hand, and the distance between the third reference point and the fourth reference point on the other hand, may be reduced to such an extent that it is smaller than or equal to the still acceptable maximum distance.

The contactless detection of the distance between the first reference point and the second reference point, using the first measuring structure 400a, may include illuminating the embossed structure 432 and the through-hole edge 435 of the first metal sheet 2a, as well as the embossed structure 434 and the through-hole edge 436 of the second metal sheet 2b, using illumination light emitted by a light source, and detecting the illumination light reflected or scattered at the embossed structure 432 and the through-hole edge 435 of the first metal sheet 2a, and at the embossed structure 434 and the through-hole edge 436 of the second metal sheet 2b, using a detection device. The procedure may be quite similar for detecting the distance between the third reference point and the fourth reference point, using the second measuring structure 400b. The light source and the detection device may, e.g., be arranged on the side of the metal sheets 2a, 2b that are positioned on top of one another which faces away from the second metal sheet 2b. With respect to the first measuring structure 400a, the illumination light may then shine through the through-hole 431 of the first metal sheet 2a onto the embossed structure 434 and the through-hole edge 436 of the second metal sheet 2b. The same then customarily applies to the corresponding structures of the second measuring structure 400b.

Using the first measuring structure 400a, the determination of the first reference point may, e.g., comprise a determination of a first position and/or an alignment of a plane of symmetry or an axis of symmetry of the embossed structure 432 and/or of the through-hole edge 435 of the first metal sheet 2a. And the determination of the second reference point may comprise a determination of a position and/or an alignment of a plane of symmetry or an axis of symmetry of the embossed structure 434 and/or of the through-hole edge 436 of the second metal sheet 2b. The determination of the distance between the first reference point and the second reference point then typically comprises a determination of a distance between the first position and the second position. Similarly, the third reference point and the fourth reference point may be determined using the second measuring structure 400b.

Figure 12:
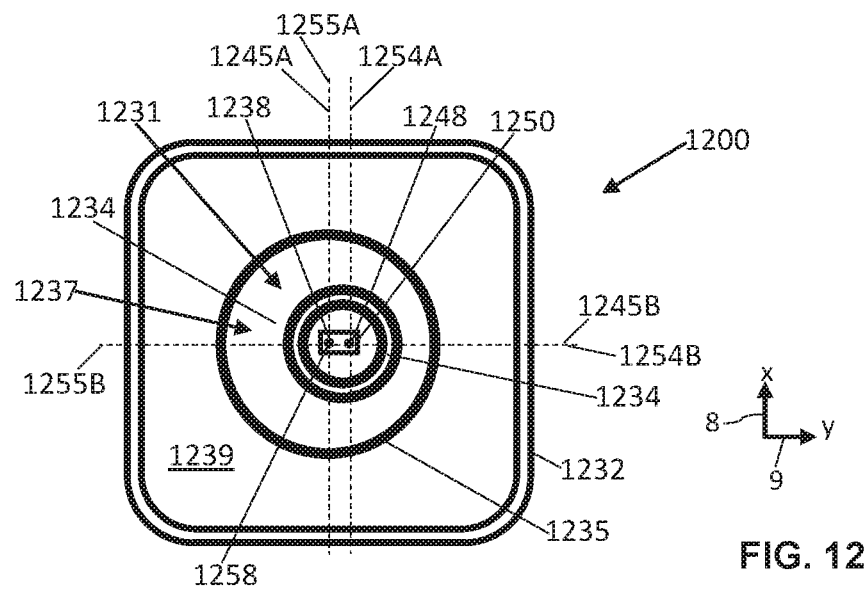
Figure 14A:
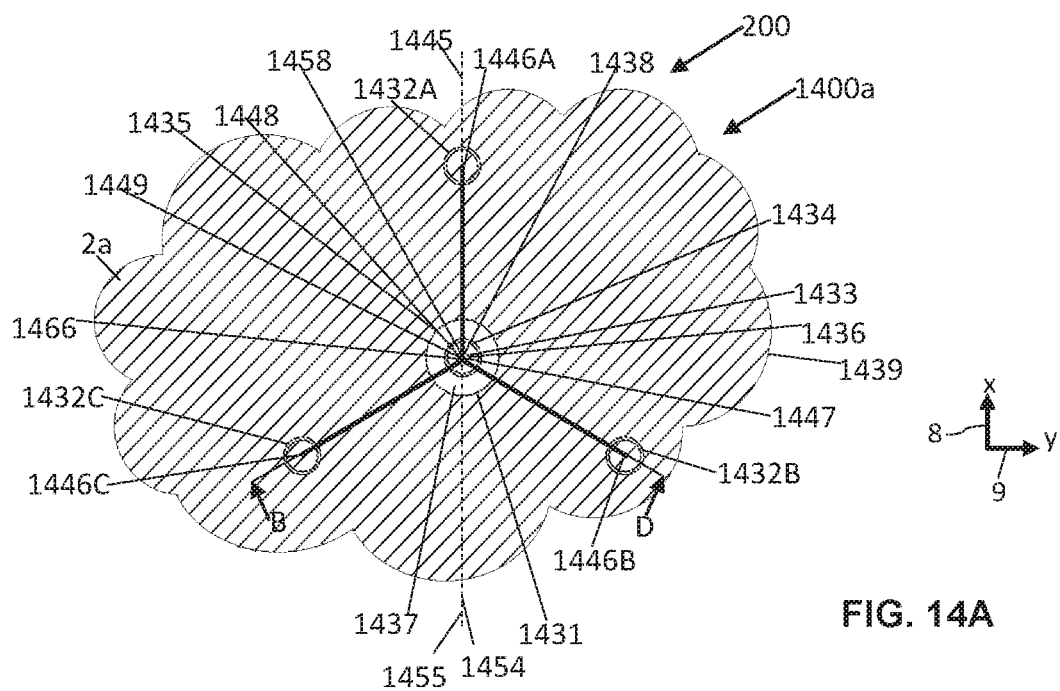
FIG. 14A schematically shows a top view onto a separator plate including a measuring structure according to a further embodiment.
Figure 14B:
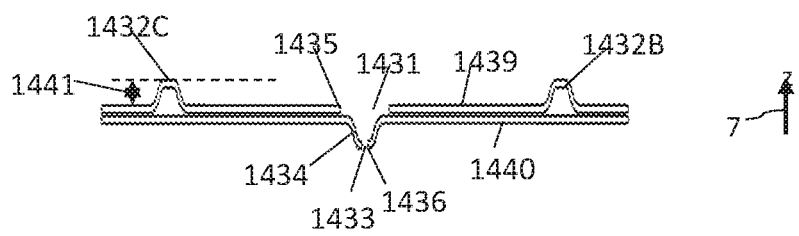
FIG. 14B schematically shows the measuring structure from FIG. 14A in a sectional illustration.
Figure 15:
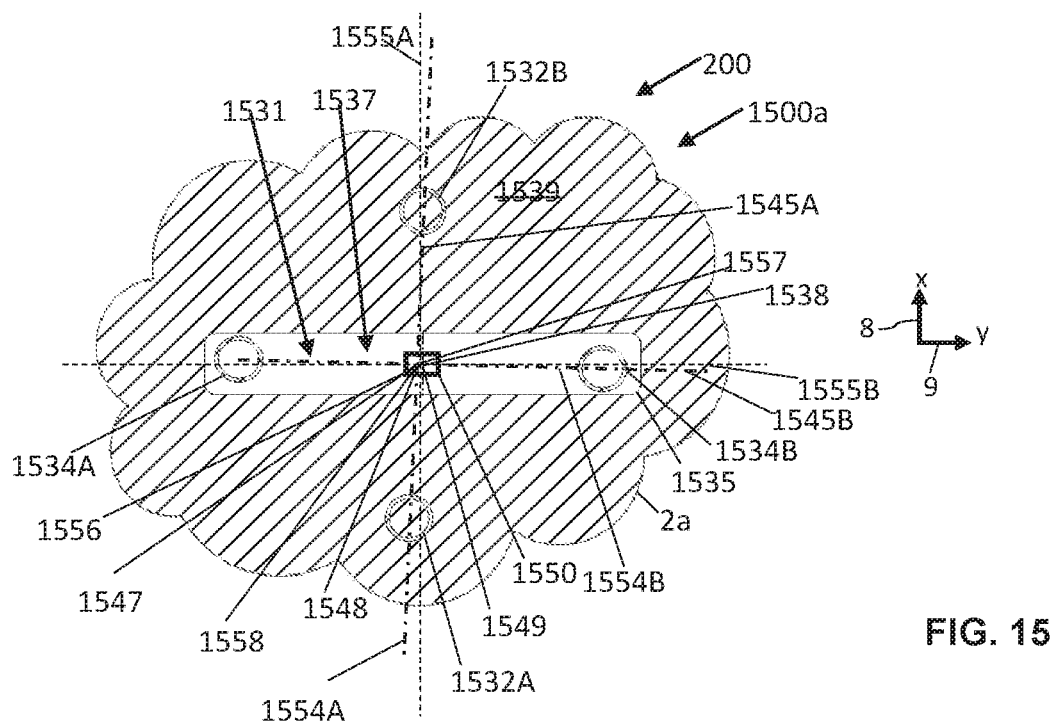
FIGS. 15 to 19 schematically show further embodiments of a measuring structure, each in a top view.

The determination of the position of reference points based on symmetries of the embossed structure and/or of the through-hole edge of the first metal sheet 2a, and based on symmetries of the embossed structure and/or of the through-hole edge of the second metal sheet 2b, is illustrated in FIGS. 12, 14 and 15 with reference to a modified embodiment of a measuring structure of the type of the measuring structure 400 according to FIGS. 4A-C, and will be described in greater detail at a later point.

The measuring structures 400a, 400b may thus, among other things, be used during the production of the separator plate 200 to identify undesirable offset between the structures embossed into the individual plates or metal sheets 2a, 2b of the separator plate 200 on the one hand, and the structures removed or stamped out from the individual plates or metal sheets 2a, 2b of the separator plate 200 on the other hand, and more particularly preferably already at an early stage of the production process, e.g., prior to joining or connecting the individual plates or metal sheets 2a, 2b. If an offset that is greater than a still acceptable maximum offset is established between the embossed structures and the stamped structures of the individual plates or metal sheets 2a, 2b by way of the measuring structures 400a, 400b after the individual plates or metal sheets 2a, 2b have been processed in a cutting or stamping tool and in an embossing tool, these metal sheets 2a, 2b may, e.g., be sorted.

Likewise, the measuring structures 400a, 400b may be used to identify a deviation of the alignment of the individual plates or metal sheets 2a, 2b relative to one another from an ideal relative alignment before the individual plates or metal sheets 2a, 2b are connected or joined, and preferably to correct this by minimizing the deviation of the relative alignment from the ideal relative alignment before the metal sheets 2a, 2b are finally joined to form the separator plate 200.

The measuring structures 400a, 400b may thus help to ensure a high accuracy during the production of the separator plate 200, and thus improve the quality of the separator plate 200.

The through-hole edge 435 defining and surrounding the through-hole 431, and the embossed structure 432 of the first metal sheet 2a, are preferably symmetrically formed in the measuring structure 400a according to FIGS. 4A-C. This allows a particularly simple determination of the arrangement of the through-hole edge 435 and of the embossed structure 432 of the first metal sheet 2a, e.g., using means of image recognition. In particular, the through-hole edge 435 of the first metal sheet 2a is arranged and formed symmetrically with respect to an axis of symmetry 438, and the embossed structure 432 of the first metal sheet 2*a* is arranged and formed symmetrically with respect an axis of symmetry 458. Here, the axes of symmetry 438, 458 are aligned perpendicularly to the aforementioned sheet planes 439, 440 of the first metal sheet 2*a* and of the second metal sheet 2*b*, and thus along the z direction or stacking direction 7. The through-hole edge 435 of the first metal sheet 2*a* defining the through-hole 431 of the first metal sheet 2*a*, and the embossed structure 432 of the first metal sheet 2*a*, follow a circular course in the measuring structure 400*a* according to FIGS. 4A-C. The through-hole edge 435 and the embossed structure 432 of the first metal sheet 2*a* thus possess continuous rotational symmetry with respect to the axis of symmetry 438 or 458, wherein the two axes of symmetry 438 and 458 coincide in the present example. In alternative embodiments, the through-hole edge 435 and the embossed structure 432 of the first metal sheet 2*a* may, e.g., also be formed and arranged so as to each possess only discrete rotational symmetry with respect to the axis of symmetry 438 and/or 458. The two axes of symmetry 438, 458 extend through the through-hole 431 of the first metal sheet 2*a* here. The embossed structure 432 of the first metal sheet 2*a* completely encloses the through-hole 431 of the first metal sheet 2*a*. Due to the continuous rotational symmetry of the through-hole 431 with respect to the axis of symmetry 438, mirror symmetry with respect to the exemplary mirror plane 445, which is perpendicular to the sheet plane 439, and with respect to any other mirror plane extending perpendicularly to the sheet plane is defined by the axis of symmetry 438. Likewise, due to the continuous rotational symmetry of the embossed structure 432 with respect to the axis of symmetry 458, mirror symmetry with respect to the exemplary mirror plane 455, which is perpendicular to the sheet plane 439, and with respect to any other mirror plane extending perpendicularly to the sheet plane is defined by the axis of symmetry 458.

In modified embodiments of the measuring structure 400*a*, it is conceivable that the through-hole edge 435 of the first metal sheet 2*a* is symmetrical with respect to a first axis of symmetry 438, and that the embossed structure 432 of the first metal sheet 2*a* is symmetrical with respect to a second axis of symmetry 458, which is spaced apart from the first axis of symmetry 438. In a modification of the measuring structure 400*a* according to FIGS. 4A-C, this could be the case, e.g., when a positioning of the first metal sheet 2*a* in an embossing tool for embossing the embossed structures 432, and for embossing further embossed structures, for example for embossing the sealing beads 12*a-d*, is flawed and deviates from an ideal positioning of the first metal sheet 2*a* in the embossing tool, and/or when a positioning of the first metal sheet 2*a* in a stamping tool for stamping the through-hole 433, and for stamping further stamped structures, for example for stamping the through-openings 11*a-c* of the first metal sheet 2*a*, is flawed and deviates from an ideal positioning of the first metal sheet 2*a* in the stamping tool. If the undesirable distance between the first axis of symmetry 438 and the second axis of symmetry 458, in this case, is greater than a still acceptable maximum distance Smax, the first metal sheet 2*a* may be sorted out, for example, and not processed further.

In the measuring structure 400*a* according to FIGS. 4A-C, the embossed structure 432 of the first metal sheet 2*a* is raised above the sheet plane 439 of the first metal sheet 2*a* in the positive z direction 7, i.e., in a direction facing away from the second metal sheet 2*b*, perpendicular to the sheet plane 439 of the first metal sheet 2*a*. The embossed structure 432 of the first metal sheet 2*a* is formed as a semi-bead here. In alternative embodiments, the embossed structure 432 of the first metal sheet 2*a* may also be formed as a full bead, or the embossed structure 432 of the first metal sheet 2*a* may include a plurality of at least partially non-contiguous substructures, which may, e.g., be defined by elevations and/or depressions embossed into the first metal sheet 2*a*. In the measuring structure 400 according to FIGS. 4A-C, the embossed structure 432 of the first metal sheet 2*a* includes a first section 432X that is inclined or angled relative to the sheet plane 439 of the first metal sheet 2*a*, and a second section 432Y that is aligned parallel to the sheet plane 439 of the first metal sheet 2*a* and surrounds the through-hole edge 435 of the first metal sheet 2*a*. In the example shown in FIG. 4C, the first section 432X of the embossed structure 432 of the first metal sheet 2*a* includes a maximum angle of at least 50 degrees with the sheet plane 439 of the first metal sheet 2*a*. The first section 432X transitions into the second section 432Y.

Proceeding from and perpendicular to the sheet plane 439 of the first metal sheet 2*a*, the second section 432Y of the embossed structure 432 of the first metal sheet 2*a* has a certain constant height 441. The height 441 is, for example, at least two times or at least three times the sheet thickness of the first metal sheet 2*a*. At the same time, the maximum height 441 of the embossed structure 432 of the first metal sheet 2*a* is less than a height of the sealing beads 12*a-d* of the first metal sheet 2*a*, which is likewise determined proceeding from and perpendicular to the sheet plane 439 of the first metal sheet 2*a*. When the sealing beads 12*a-d* of the first metal sheet 2*a* are pressed together as intended to form a plate stack as that shown in FIG. 1, the embossed structure 432 of the first metal sheet 2*a* itself is thus not pressed together.

In the measuring structure 400*a* according to FIGS. 4A-C, the through-hole 431 of the first metal sheet 2*a* has a diameter or maximum diameter d1max of 5 mm, for example. In alternative embodiments, the diameter d1max may have a value between 1.5 mm and 8 mm. However, the diameter d1max may also take on values that are smaller than 1.5 mm or that are greater than 8 mm. An end of the embossed structure 432 of the first metal sheet 2*a* which faces away from the through-hole 431 of the first metal sheet 2*a* has a maximum distance D1max of no more than 0.3·d1max from the through-hole edge 435 of the first metal sheet 2*a*. In alternative embodiments, however, D1max may also take on larger values. For example, in these cases D1max≤d1max, D1max≤3·d1max or D1max≤5·d1max may apply.

The through-hole edge 436 defining and surrounding the through-hole 433, and the embossed structure 434 of the second metal sheet 2*b*, are preferably symmetrically formed in the measuring structure 400*a* according to FIGS. 4A-C. This allows a particularly easy determination of the arrangement of the through-hole edge 436 and of the embossed structure 434 of the second metal sheet 2*b*, e.g., using means of image recognition. In particular, the through-hole edge 436 of the second metal sheet 2*b* is arranged and formed symmetrically with respect to the axis of symmetry 468, and the embossed structure 434 of the second metal sheet 2*b* is arranged and formed symmetrically with respect the axis of symmetry 448. The through-hole edge 436 of the second metal sheet 2*b* defining the through-hole 433 of the second metal sheet 2*b*, and the embossed structure 434 of the second metal sheet 2*b*, follow a circular course in the measuring structure 400*a* according to FIGS. 4A-C. The through-hole edge 436 and the embossed structure 434 of the second metal sheet 2b thus possess continuous rotational symmetry with respect to the axis of symmetry 468 and/or 448. In alternative embodiments, the through-hole edge 436 and the embossed structure 434 of the second metal sheet 2b may also be formed and arranged so as only possess discrete rotational symmetry with respect to the axis of symmetry 468 and/or 448. The axes of symmetry 468 and 448 extend through the through-hole 433 of the second metal sheet 2b here. The embossed structure 434 of the second metal sheet 2b completely encloses the through-hole 433 of the second metal sheet 2b. In the present example, the axes of symmetry 468 and 448 coincide with one another, as well as with the aforementioned axes of symmetry 438 of the first through-hole 431 and 458 of the first embossed structure 432 of the first metal sheet 2a.

In modified embodiments of the separator plate 200, it is conceivable that the through-hole edge 436 of the second metal sheet 2b is symmetrical with respect to a third axis of symmetry 468, and that the embossed structure 434 of the second metal sheet 2b is symmetrical with respect to a fourth axis of symmetry 448, which is spaced apart from the third axis of symmetry. In a modification of the measuring structure according to FIGS. 4A-C, this could be the case, e.g., when a positioning of the second metal sheet 2b in an embossing tool for embossing the embossed structures 434, and for embossing further embossed structures, for example for embossing sealing beads of the second metal sheet 2b, is flawed and deviates from an ideal positioning of the second metal sheet 2b in the embossing tool, and/or when a positioning of the second metal sheet 2b in a stamping tool for stamping the through-hole 433, and for stamping further stamped structures, for example for stamping through-openings 11a-c of the second metal sheet 2b, is flawed and deviates from an ideal positioning of the second metal sheet 2b in the stamping tool. If the undesirable distance between the third axis of symmetry 468 and the fourth axis of symmetry 448, in this case, is greater than a still acceptable maximum distance S'max, the second metal sheet 2b may be sorted out, for example, and not processed further.

In the measuring structure 400a according to FIGS. 4A-C, in particular the axes of symmetry 468 and 448 of the through-hole edge 435 of the first metal sheet 2a and of the embossed structure 434 of the second metal sheet 2b also coincide, since both are also identical to the axis of symmetry 438. In modified embodiments of the measuring structure 400a, however, it is conceivable that the through-hole edge 435 of the first metal sheet 2a is, e.g., symmetrical with respect to the aforementioned first axis of symmetry 438, and that the embossed structure 434 of the second metal sheet 2b is symmetrical with respect to the aforementioned fourth axis of symmetry 448, which is spaced apart from the first axis of symmetry. In a modification of the measuring structure 400a according to FIGS. 4A-C, this could be the case, e.g., when a positioning of the first metal sheet 2a and/or of the second metal sheet 2b in a joining tool for connecting the first metal sheet 2a to the second metal sheet 2b in the joining tool is flawed and deviates from an ideal positioning of the first metal sheet 2a and of the second metal sheet 2b in the joining tool. If the undesirable distance between the first axis of symmetry 438 of the through-hole edge 435 of the first metal sheet 2a and the fourth axis of symmetry 448 of the embossed structure 434 of the second metal sheet 2b in this case is greater than a still acceptable maximum distance S"max, the positioning of the first metal sheet 2a and/or of the second metal sheet 2b in the joining tool may be corrected in such a way that the distance between the first axis of symmetry 438 and the fourth axis of symmetry 448 after the correction is smaller than the still acceptable maximum distance S"max. For optimal positioning of the metal sheets 2a, 2b in the joining tool, a possibly undesirable distance between corresponding axes of symmetry of the second measuring structure 400b is preferably likewise minimized until this distance is also smaller than a still acceptable maximum distance.

In the measuring structure 400a according to FIGS. 4A-C, the embossed structure 434 of the second metal sheet 2b is raised above the sheet plane 440 of the second metal sheet 2b in the negative z direction 7, i.e., in a direction facing away from the first metal sheet 2a, perpendicular to the sheet plane 440 of the second metal sheet 2b. The embossed structure 434 of the second metal sheet 2b is formed as a semi-bead here. In alternative embodiments, the embossed structure 434 of the second metal sheet 2b may also be formed as a full bead, or the embossed structure 434 of the second metal sheet 2b may include a plurality of at least partially non-contiguous sub-structures, which may, e.g., be defined by elevations and/or depressions embossed into the second metal sheet 2b. The embossed structure 434 of the second metal sheet 2b includes a first section 434X that is inclined or angled relative to the sheet plane 440 of the second metal sheet 2b, and a second section 434Y that is aligned parallel to the sheet plane 440 of the second metal sheet 2b and includes the through-hole edge 436 of the second metal sheet 2b In the shown example, the first section 434X of the embossed structure 434 of the second metal sheet 2b includes a maximum angle of at least 50 degrees with the sheet plane 440 of the second metal sheet 2b. The first section 434X transitions into the second section 434Y.

Proceeding from and perpendicular to the sheet plane 440 of the second metal sheet 2b, the second section 434Y of the embossed structure 434 of the second metal sheet 2b has a certain constant height 442. The height 442 is, for example, at least two times or at least three times the sheet thickness of the second metal sheet 2b. At the same time, the maximum height 442 of the embossed structure 434 of the second metal sheet 2b is less than a height of sealing beads of the second metal sheet 2b, which is likewise determined proceeding from and perpendicular to the sheet plane 440 of the second metal sheet 2b. When the sealing beads of the second metal sheet 2b are pressed together as intended to form a plate stack as that shown in FIG. 1, the embossed structure 434 of the second metal sheet 2b itself is thus not pressed together.

In the measuring structure 400a according to FIGS. 4A-C, the through-hole 433 of the second metal sheet 2b has a diameter or maximum diameter d2max that is smaller than the diameter d1max of the through-hole 431 of the first metal sheet 2a. Here, approximately d1max=4·d2max applies for d1max and d2max. In alternative embodiments, and in particular in alternative embodiments that likewise possess continuous rotational symmetry of the entire measuring structure, for example, 1.5·d2max≤d1 max≤8·d2max may apply. Here, the diameter or the maximum diameter d2max of the through-hole 433 of the second metal sheet 2b is 2 mm, for example. In alternative embodiments, the diameter d2max may, e.g., take on a value between 0.5 mm and 5 mm. However, the diameter d2max may also take on values that are greater than 5 mm. An end of the embossed structure 434 of the second metal sheet 2b which faces away from the through-hole 433 of the second metal sheet 2b has a maximum distance D2max of approximately 0.75·d2max from the through-hole edge 436 of the second metal sheet 2b. In alternative embodiments, however, D2max may also take on other values. For example, in these cases D2max=0.2·d2max, D2max=d2max, D2max≤3·d2max or D2max≤5·d2max may apply.

Figure 5:
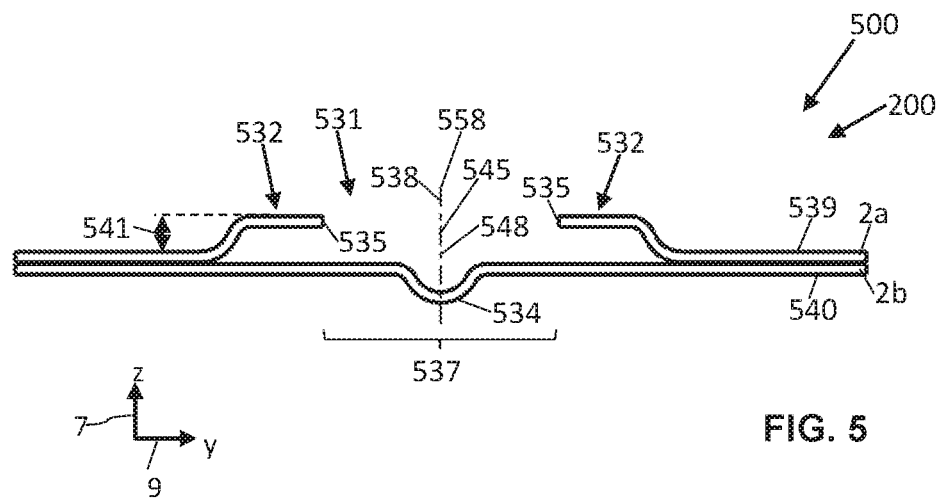
FIGS. 5 to 9 schematically show further embodiments of a measuring structure, each in a sectional illustration.

FIG. 5 shows a sectional view through a measuring structure 500 of the separator plate 200 according to FIG. 4A, wherein, as before, the cutting plane is aligned along the y-z plane and thus parallel to the z direction or stacking direction 7. The measuring structure 500 according to FIG. 5 is a modification of the measuring structures 400a, 400b according to FIGS. 4A-C. The measuring structure 500 may replace the measuring structures 400a, 400b of the separator plates 200. However, the separator plate 200 may also include both types of measuring structures 400a, 400b and 500, and in particular may include a total of two measuring structures. As before, here and hereafter (with the exception of FIG. 10), recurring features are designated with identical or similar reference numerals, and in particular with reference numerals that are identical with respect to the last two places thereof (1st and 2nd places before the decimal point), however that in the places before that (3rd and possibly 4th places before the decimal point) are numbered in accordance with the number of the figure. To avoid repetition, hereafter primarily the differences between the measuring structure 500 according to FIG. 5 and the measuring structures 400a, 400b according to FIGS. 4A-C are described. The features of the measuring structure 500 according to FIG. 5, which are not explicitly described, may be formed as in the above-described measuring structures 400a, 400b according to FIGS. 4A-C.

The measuring structure 500 according to FIG. 5 differs from the measuring structures 400a, 400b according to FIGS. 4A-C by not including a through-hole, but only an embossed structure 534 in the second metal sheet 2b. The embossed structure 534 of the second metal sheet 2b has the configuration of a depression or elevation in the second metal sheet 2b, which is raised above the sheet plane 540 of the second metal sheet 2b in a direction facing away from the first metal sheet 2b, perpendicular to the sheet plane 540 of the second metal sheet 2b. A maximum extension of the embossed structure 534 of the second metal sheet 2b parallel to the sheet plane 540 of the second metal sheet 2b is smaller than the diameter or the maximum diameter d1max of the through-hole 531 of the first metal sheet 2a. For example, the maximum extension of the embossed structure 534 of the second metal sheet 2b parallel to the sheet plane 540 of the second metal sheet 2b may be smaller than or equal to half the diameter d1max of the through-hole 531 of the first metal sheet 2a. As in the measuring structures 400a, 400b according to FIGS. 4A-C, the embossed structures 532, 534 in the measuring structure 500 according to FIG. 5 may each be symmetrically formed and arranged with respect to the shared axes of symmetry 558, 548 thereof, which moreover are identical, wherein the axes of symmetry 558, 548 are aligned perpendicularly to the sheet planes 539, 540 of the metal sheets 2a, 2b. At the same time, the axes of symmetry 558, 548 each represent an intersecting line through the mirror planes 545 and 554 of the embossed structures 532, 534.

Figure 6:
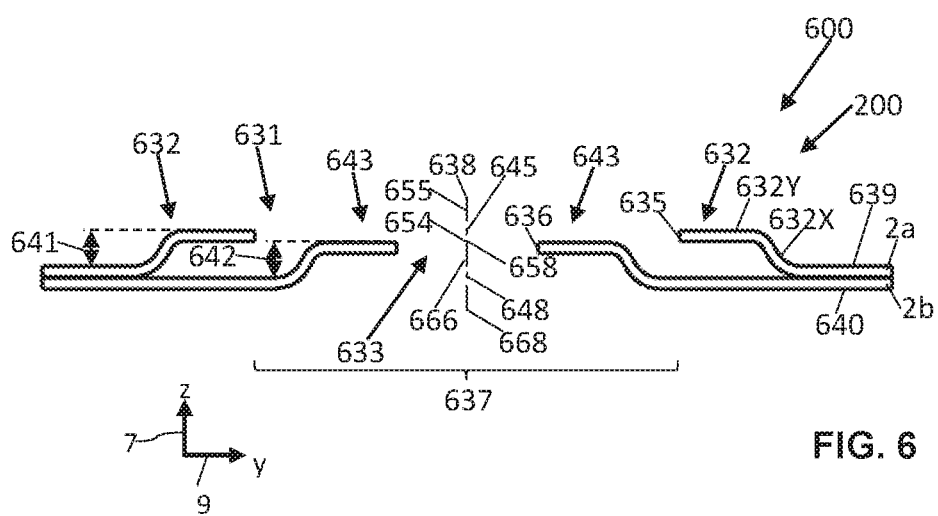

FIG. 6 shows a sectional view through a measuring structure 600 of the separator plate 200 according to FIG. 4A, wherein, as before, the cutting plane is aligned along the y-z plane and thus parallel to the z direction or stacking direction 7. The measuring structure 600 according to FIG. 6 is a modification of the measuring structures 400a, 400b according to FIGS. 4A-C. The measuring structure 600 may replace the measuring structures 400a, 400b or 500 of the separator plates 200. However, the separator plate 200 may also include only one, several, in particular a total of two, or all of the measuring structures 400a, 400b, 500 and 600. To avoid repetition, hereafter primarily the differences between the measuring structure 600 according to FIG. 6 and the measuring structures 400a, 400b according to FIGS. 4A-C are described. The features of the measuring structure 600 according to FIG. 6, which are not explicitly described, may be formed as in the above-described measuring structures 400a, 400b according to FIGS. 4A-C.

The measuring structure 600 according to FIG. 6 differs from the measuring structures 400a, 400b according to FIGS. 4A-C in that the embossed structure 634 of the second metal sheet 2b formed as a semi-bead is raised above the sheet plane 640 of the second metal sheet 2b in a direction facing the first metal sheet 2a, perpendicular to the sheet plane 640 of the second metal sheet 2b, which coincides with the z direction or stacking direction 7 here. Along the stacking direction 7, however, the embossed structure 634 does not protrude beyond the through-hole edge 635 of the through-hole 633 of the first metal sheet 2a. The height 642 of the embossed structure 634 of the second metal sheet 2b, which is determined proceeding from and perpendicular to the sheet plane 640 of the second metal sheet 2b, may be equal to or possibly smaller than the height 641 of the embossed structure 632 of the first metal sheet 2a, which is determined proceeding from and perpendicular to the sheet plane 639 of the first metal sheet 2a. The diameter of the embossed structure 234 of the second metal sheet 2b is approximately 85% of the diameter of the through-hole 631 of the first metal sheet 2a.

Figure 7:
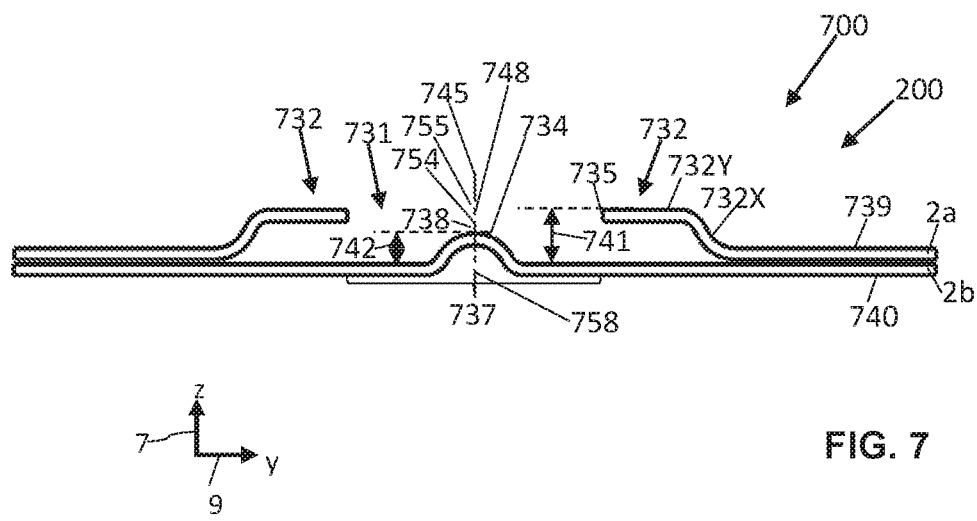

FIG. 7 shows a sectional view through a measuring structure 700 of the separator plate 200 according to FIG. 4A, wherein, as before, the cutting plane is aligned along the y-z plane and thus parallel to the z direction or stacking direction 7. The measuring structure 700 according to FIG. 7 is a modification of the measuring structure 500 according to FIG. 5. The measuring structure 700 may replace the measuring structures 400a, 400b, 500 or 600 of the separator plates 200. However, the separator plate 200 may also include only one, several, in particular a total of two, or all of the measuring structures 400a, 400b, 500, 600 and 700. To avoid repetition, hereafter primarily the differences between the measuring structure 700 according to FIG. 7 and the measuring structure 500 according to FIG. 5 are described. The features of the measuring structure 700 according to FIG. 7, which are not explicitly described, may be formed as in the measuring structure 500 according to FIG. 5.

The measuring structure 700 according to FIG. 7 differs from the measuring structure 500 according to FIG. 5 in that the embossed structure 734 of the second metal sheet 2b formed as a depression or an elevation in the second metal sheet 2b is raised above the sheet plane 740 of the second metal sheet 2b in a direction facing the first metal sheet 2a, perpendicular to the sheet plane 740 of the second metal sheet 2b, which coincides with the positive z direction or stacking direction 7 here. At the same time, the embossed structure 734 of the second metal sheet 2b is raised at least in areas above the sheet plane 739 of the first metal sheet 2a in the positive z direction 7. Along the stacking direction 7, however, the embossed structure 734 does not protrude beyond the through-hole edge 735 of the through-hole 733 of the first metal sheet 2a, which is part of the embossed structure 732 of the first metal sheet 2a formed as a semi-bead here. The height 742 of the embossed structure 734 of the second metal sheet 2b, which is determined proceeding from and perpendicular to the sheet plane 740 of the second metal sheet 2b, may be equal to or possibly smaller than the height 741 of the embossed structure 732 of the first metal sheet 2a, which is determined proceeding from and perpendicular to the sheet plane 739 of the first metal sheet 2a.

Figure 8:
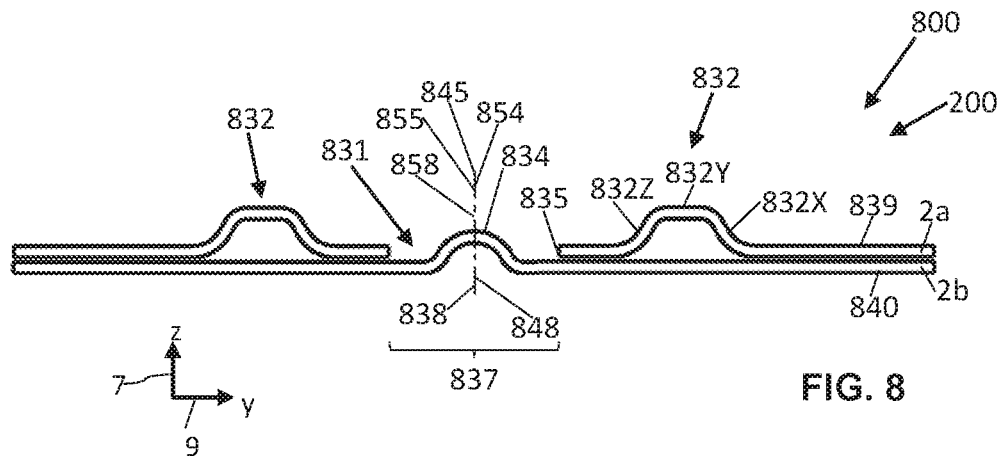

FIG. 8 shows a sectional view through a measuring structure 800 of the separator plate 200 according to FIG. 4A, wherein, as before, the cutting plane is aligned along the y-z plane and thus parallel to the z direction or stacking direction 7. The measuring structure 800 according to FIG. 8 is a modification of the measuring structure 700 according to FIG. 7. The measuring structure 800 may replace the measuring structures 400a, 400b, 500, 600 or 700 of the separator plates 200. However, the separator plate 200 may also include only one, several, in particular a total of two, or all of the measuring structures 400a, 400b, 500, 600, 700 and 800. To avoid repetition, hereafter primarily the differences between the measuring structure 800 according to FIG. 8 and the measuring structure 700 according to FIG. 7 are described. The features of the measuring structure 800 according to FIG. 8, which are not explicitly described, may be formed as in the measuring structure 700 according to FIG. 7.

The measuring structure 800 according to FIG. 8 differs from the measuring structure 700 according to FIG. 7 in that the embossed structure 832 of the first metal sheet 2a is formed as a full bead. On the side facing away from the through-hole 831 of the first metal sheet 2a, the embossed structure 832 of the first metal sheet 2a includes a first section 832X that is inclined or angled relative to the sheet plane 839 of the first metal sheet 2a. A second section 832Y, which is aligned parallel to the sheet plane 839 of the first metal sheet 2a, adjoins the first section 832X. And on the side facing the through-hole 831 of the first metal sheet 2a, the embossed structure 832 of the first metal sheet 2a includes a third section 832Z that is inclined or angled relative to the sheet plane 839 of the first metal sheet 2a and adjoins the second section 832Y. For example, the first section 832X and the third section 832Z of the embossed structure 832 of the first metal sheet 2a each include a maximum angle of at least 50 degrees with the sheet plane 839 of the first metal sheet 2a.

The embossed structure 832 of the first metal sheet 2a formed as a full bead extends around the through-hole 831 of the first metal sheet 2a and is spaced apart from the through-hole edge 835 of the first metal sheet 2a which encloses the through-hole 831. For example, the minimum distance of the first embossed structure 832, measured as the minimum distance between the third section 832Z of the embossed structure 832 which faces the through-hole 831 and the through-hole edge 835, is approximately 45% of the maximum diameter d1max of the through-hole 831 of the first metal sheet 2a. A maximum distance of the first embossed structure 832, and in particular a maximum distance between the first section 832X of the embossed structure 832 which faces away from the through-hole 831 and the through-hole edge 835, may, e.g., be no more than ten times, no more than five times, or no more than three times the maximum diameter d1max of the through-hole 831 of the first metal sheet 2a.

Figure 9:
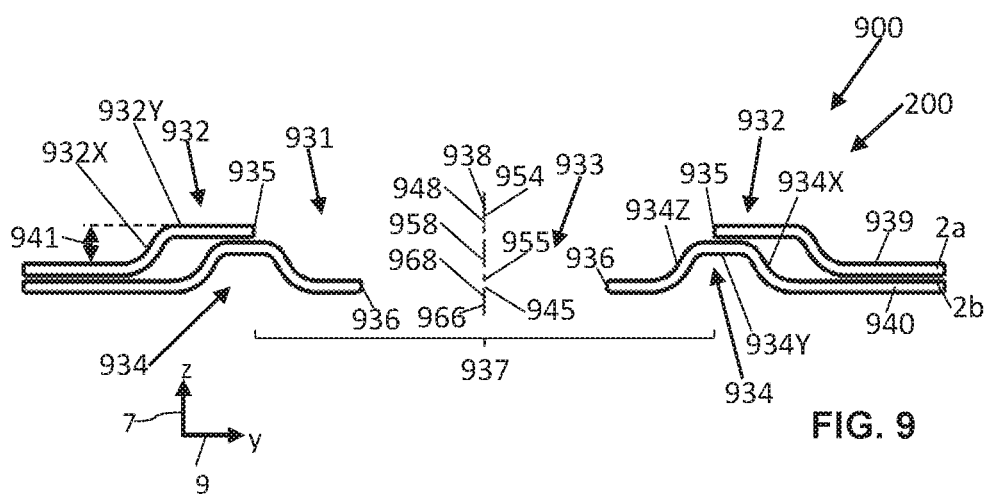

FIG. 9 shows a sectional view through a measuring structure 900 of the separator plate 200 according to FIG. 4A, wherein, as before, the cutting plane is aligned along the y-z plane and thus parallel to the z direction or stacking direction 7. The measuring structure 900 according to FIG. 9 is a modification of the measuring structure 600 according to FIG. 6. The measuring structure 900 may replace the measuring structures 400a, 400b, 500, 600, 700 or 800 of the separator plates 200. However, the separator plate 200 may also include only one, several, in particular a total of two, or all of the measuring structures 400a, 400b, 500, 600, 700, 800 or 900. To avoid repetition, hereafter primarily the differences between the measuring structure 900 according to FIG. 9 and the measuring structure 600 according to FIG. 6 are described. The features of the measuring structure 900 according to FIG. 9, which are not explicitly described, may be formed as in the above-described measuring structure 600 according to FIG. 6.

The measuring structure 900 according to FIG. 9 differs from the measuring structure 600 according to FIG. 6 in that the embossed structure 934 of the second metal sheet 2b is formed as a full bead. On the side facing away from the through-hole 933 of the second metal sheet 2b, the embossed structure 934 of the second metal sheet 2b includes a first section 934X that is inclined or angled relative to the sheet plane 940 of the second metal sheet 2b. A second section 934Y, which is aligned parallel to the sheet plane 940 of the second metal sheet 2b, adjoins the first section 934a. And on the side facing the through-hole 933 of the second metal sheet 2b, the embossed structure 934 of the second metal sheet 2b includes a third section 934Z that is inclined or angled relative to the sheet plane 940 of the second metal sheet 2b and adjoins the second section 934Y. For example, the first section 934X and the third section 934Z of the embossed structure 934 of the second metal sheet 2b each include a maximum angle of at least 50 degrees with the sheet plane 940 of the second metal sheet 2b.

The embossed structure 934 of the second metal sheet 2b formed as a full bead extends around the through-hole 933 of the second metal sheet 2b and is spaced apart from the through-hole edge 936 of the second metal sheet 2b which encloses the through-hole 933.

With a viewing direction or light incidence direction along the negative z direction 7, the embossed structure 934 of the second metal sheet 2b formed as a full bead is at least partially hidden by the first metal sheet 2b, and in particular by the embossed structure 932 of the first metal sheet 2a which is formed as a semi-bead. Here, the first metal sheet 2a hides the first section 934X of the embossed structure 934 which faces away from the through-hole 933 of the second metal sheet 2b entirely, and hides approximately half of the second section 934Y of the embossed structure 934. Light that passes through the through-hole 931 of the first metal sheet 2a along the negative z direction 7 here thus only illuminates the third section 934Z facing the through-hole 933, and a portion of the second section 934Y of the embossed structure 934 of the second metal sheet 2b, so that an area comparable to a semi-bead is illuminated here, which has at least one area of curvature.

Figure 10:
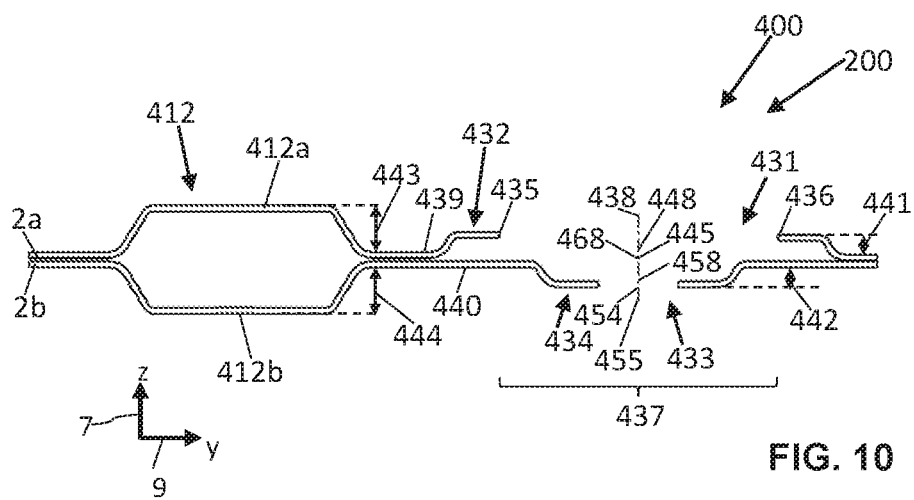
FIG. 10 schematically shows the measuring structure from FIG. 4C and a sealing bead in a sectional illustration.

FIG. 10 shows a sectional view through the separator plate 200 according to FIG. 4A including the measuring structure 400 according to FIGS. 4A-C and a sealing bead 412, wherein the portions of the sealing bead 412 embossed into the first metal sheet 2a and into the second metal sheet 2b are designated with 412a and 412b here. As before, the cutting plane is aligned along the y-z plane, and thus parallel to the z direction or stacking direction 7.

It may be derived from FIG. 10 that the height 441 of the embossed structure 432 of the first metal sheet 2a, which is determined proceeding from and perpendicular to the sheet plane 439 of the first metal sheet 2a, is also lower than a height 443 of the sealing bead 412a of the first metal sheet 2a, which is determined proceeding from and perpendicular to the sheet plane 439 of the first metal sheet 2a, when the sealing bead 412 has been pressed as intended, and that the height 442 of the embossed structure 434 of the second metal sheet 2*b*, which is determined proceeding from and perpendicular to the sheet plane 440 of the second metal sheet 2*b*, is also lower than a height 444 of the sealing bead 412*b* of the second metal sheet 2*b*, which is determined proceeding from and perpendicular to the sheet plane 440 of the second metal sheet 2*b*, when the sealing bead 412 has been pressed as intended.

Figure 11:
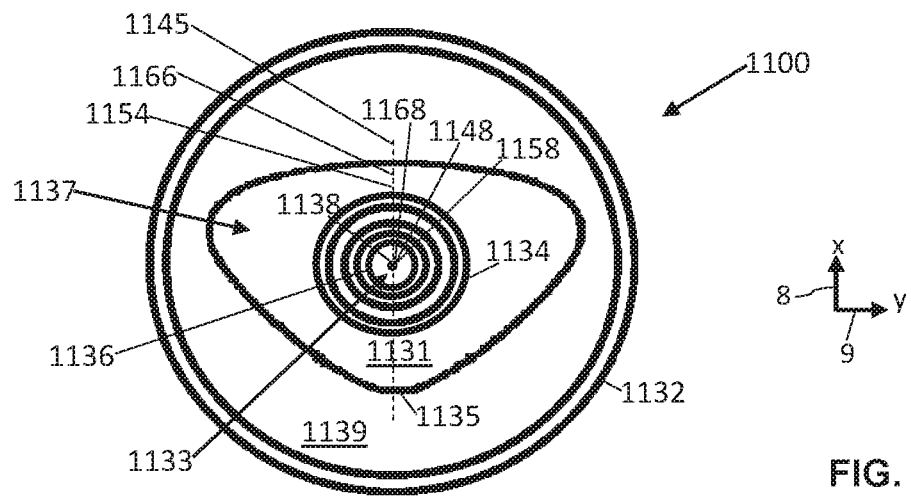
FIGS. 11 to 13 schematically show further embodiments of a measuring structure, each in a top view.

FIG. 11 shows a measuring structure 1100 of the separator plate 200 according to FIG. 4A in a top view, wherein, as in FIG. 4A, the viewing direction is oriented along the negative z direction 7. The measuring structure 1100 according to FIG. 11 is a modification of the measuring structure 400 according to FIGS. 4A-C. The measuring structure 1100 may replace the measuring structures 400*a*, 400*b*, 500, 600, 700, 800 or 900 of the separator plate 200. However, the separator plate 200 may also include only one, several, in particular a total of two, or all of the measuring structures 400*a*, 400*b*, 500, 600, 700, 800, 900, 1100. To avoid repetition, hereafter primarily the differences between the measuring structure 1100 according to FIG. 11 and the measuring structure 400 according to FIGS. 4A-C are described. The features of the measuring structure 1100 according to FIG. 11, which are not explicitly described, may be formed as in the above-described measuring structure 400 according to FIGS. 4A-C.

The measuring structure 1100 according to FIG. 11 differs from the measuring structure 400 according to FIGS. 4A-C in that the through-hole edge 1131 of the first metal sheet 2*a* only possesses mirror symmetry with respect to a mirror plane 1145. The course of the through-hole edge 1131 of the first metal sheet 2*a* parallel to the x-y plane or parallel to the sheet plane of the first metal sheet 2*a* has the shape of a triangle having rounded corners and slightly bent edges. The mirror plane is situated perpendicularly on the sheet plane 1139 of the first metal sheet 2*a* and is aligned parallel to the stacking direction 7. The embossed structure 1132 of the first metal sheet 2*a* as well as the embossed structure 1134 and the through-hole edge 1136 of the second metal sheet 2*b*, however, each possess continuous rotational symmetry with respect to the axes of symmetry 1158, 1148 thereof, which are identical among one another. The axes of symmetry 1158, 1148 are aligned along the stacking direction 7 and perpendicular to the sheet planes of the metal sheets 2*a*, 2*b*. The axes of symmetry 1158, 1148 and the mirror plane 1145 coincide, i.e., the axes of symmetry 1158, 1148 extend inside the mirror plane 1145. In contrast to the measuring structure 400 according to FIGS. 4A-C, the embossed structure 1134 of the second metal sheet 2*b* is furthermore formed as a full bead in the measuring structure 1100 according to FIG. 11, wherein, however, in contrast to the embossed structure 934 in FIG. 9, the entire embossed structure 1134 is located in the area 1137 that is defined by a perpendicular projection of the first through-hole 1131 onto the second metal sheet 2*b*.

FIG. 12 shows a measuring structure 1200 of the separator plate 200 according to FIG. 4A in a top view, wherein, as in FIG. 4A, the viewing direction is oriented along the negative z direction 7. The measuring structure 1200 according to FIG. 12 is a modification of the measuring structure 400 according to FIGS. 4A-C. The measuring structure 1200 may replace the measuring structures 400*a*, 400*b*, 500, 600, 700, 800, 900 or 1100 of the separator plate 200. However, the separator plate 200 may also include only one, several, in particular a total of two, or all of the measuring structures 400*a*, 400*b*, 500, 600, 700, 800, 900, 1100, 1200. To avoid repetition, hereafter primarily the differences between the measuring structure 1200 according to FIG. 12 and the measuring structure 400 according to FIGS. 4A-C are described. The features of the measuring structure 1200 according to FIG. 12, which are not explicitly described, may be formed as in the above-described measuring structure 400 according to FIGS. 4A-C.

The measuring structure 1200 according to FIG. 12 differs from the measuring structure 400 according to FIGS. 4A-C in that no through-hole edge is present in the second metal sheet, and the embossed structure 1232 of the first metal sheet 2*a* only possesses discrete rotational symmetry with respect to the axis of symmetry 1258, and in particular four-fold rotational symmetry. The course of the embossed structure 1232 of the first metal sheet 2*a* parallel to the x-y plane or to the sheet plane of the first metal sheet 2*a* has the shape of a square having rounded corners. The through-hole edge 1235 of the first metal sheet 2*a* as well as the embossed structure 1234 and the through-hole edge 1236 of the second metal sheet 2*b*, however, each possess continuous rotational symmetry with respect to the axes of symmetry 1238 and 1248. The axes of symmetry 1238 and 1258 on the one hand, and 1248 on the other hand, however, do not coincide here, in contrast to the preceding measuring structures. Accordingly, the mirror planes 1255A of the first through-hole 1231 and 1245A of the first embossed structure 1232 are also displaced with respect to one another. However, the respective distance is smaller than a maximum permissible distance 1250, so that the two metal sheets 2*a*, 2*b* are positioned with respect to one another, and may be joined to one another, with an acceptable tolerance.

Figure 13:
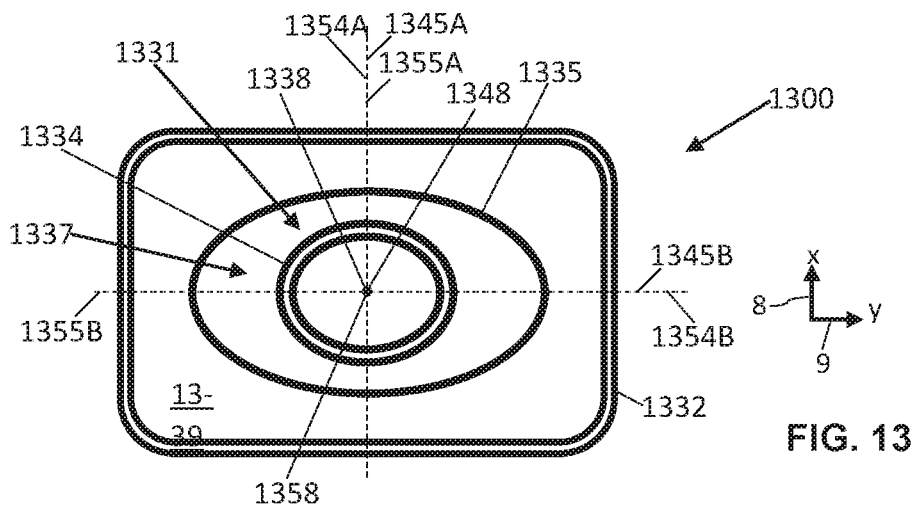

FIG. 13 shows a measuring structure 1300 of the separator plate 200 according to FIG. 4A in a top view, wherein, as in FIG. 4A, the viewing direction is oriented along the negative z direction 7. The measuring structure 1300 according to FIG. 13 is a modification of the measuring structure 1200 according to FIG. 13. The measuring structure 1300 may replace the measuring structures 400*a*, 400*b*, 500, 600, 700, 800, 900, 1100, 1200 of the separator plate 200. However, the separator plate 200 may also include only one, several, in particular a total of two, or all of the measuring structures 400*a*, 400*b*, 500, 600, 700, 800, 900, 1100, 1200, 1300. To avoid repetition, hereafter primarily the differences between the measuring structure 1300 according to FIG. 13 and the measuring structure 1200 according to FIG. 13 are described. The features of the measuring structure 1300 according to FIG. 13, which are not explicitly described, may be formed as in the above-described measuring structure 1200 according to FIG. 12.

The measuring structure 1300 according to FIG. 13 differs from the measuring structure 1200 according to FIG. 12 in that the embossed structure 1332 and the through-hole edge 1335 of the first metal sheet 2*a*, as well as the embossed structure 1334 of the second metal sheet 2*b*, each only possess discrete rotational symmetry with respect to the respective axis of symmetry 1358, 1338, 1348 thereof, wherein these axes of symmetry 1358, 1338, 1348 have an identical course, and more particularly each possess twofold rotational symmetry. The course of the embossed structure 1232 of the first metal sheet 2*a* parallel to the x-y plane or to the sheet plane of the first metal sheet 2*a* has the shape of a rectangle having rounded corners. In contrast, the course of the through-hole edge 1335 of the first metal sheet 2*a*, as well as of the embossed structure 1334 and of the through-hole edge 1336 of the second metal sheet 2*b*, each have an oval or elliptical shape. The first embossed structure 1332 of the first metal sheet 2*a* is thus mirror-symmetrical with respect to a first mirror plane 1345A and a second mirror plane 1345B, the first through-hole edge 1335 of the first metal sheet 2*a* is mirror-symmetrical with respect to a first mirror plane 1355A and a second mirror plane 1355B, and the first embossed structure 1334 of the second metal sheet 2*b* is mirror-symmetrical with respect to a first mirror plane 1354A and a second mirror plane 1354B, wherein these first mirror planes 1345A, 1355A and 1354A are each identical among one another, and the second mirror planes 1345B, 1355B and 1354B are likewise identical among one another. This also represents a difference compared to FIG. 12. All of the six aforementioned mirror planes 1345A, 1345B, 1355A, 1355B, 1354A, 1354B are situated perpendicularly on the sheet planes of the metal sheets 2*a*, 2*b* and are aligned parallel to the stacking direction 7. The mirror planes 1345A and 1345B and the mirror planes 1355A and 1355B, as well as the mirror planes 1354A and 1354B, are furthermore situated perpendicularly to one another in pairs, and intersect along the identical axes of symmetry 1358, 1338, 1348, which form the centroid of the embossed structure 1332, of the embossed structure 1334 and of the through-hole 1331.

FIG. 14A shows a measuring structure 1400*a* of the separator plate 200 according to FIG. 4A in a top view, wherein, as in FIG. 4A, the viewing direction is oriented along the negative z direction 7. The measuring structure 1400*a* may replace the measuring structures 400*a*, 400*b*, 500, 600, 700, 800, 900, 1100, 1200, 1300 of the separator plate 200. However, the separator plate 200 may also include only one, several, in particular a total of two, or all of the measuring structures 400*a*, 400*b*, 500, 600, 700, 800, 900, 1100, 1200, 1300, 1400*a*.

The measuring structure 1400*a* includes an embossed structure 1432, which is embossed into the first metal sheet 2*a* (hatched) and encompasses the three sub-structures 1432A-C. The sub-structures 1432A-C of the embossed structure 1432 of the first metal sheet 2*a* are each defined by annular depressions in the first metal sheet 2*a*. The measuring structure 1400 furthermore includes a through-hole 1431 in the first metal sheet 2*a*, which is surrounded and delimited by a circular through-hole edge 1435. The sub-structures 1432A-C of the embossed structure 1432 of the first metal sheet 2*a* are arranged around the through-hole 1431, and more particularly in such a way that the centroids 1446A-C of the three annular sub-structures 1432A-C form the corners of a triangle, which here in particular are the corners of an equilateral triangle. This triangle, in turn, defines a centroid 1447 of this triangle or equilateral triangle.

The circular through-hole edge 1435 of the first metal sheet 2*a* is arranged within this triangle and defines a centroid 1449 of the area or circular area spanned by the through-hole edge 1435 of the first metal sheet 2*a*. In the embodiment shown in FIG. 14, the centroid 1447 of the triangle spanned by the corner points 1446A-C and the centroid 1449 or center of the area, or circular area, spanned by the through-hole edge 1435 coincide, or approximately coincide.

The measuring structure 1400*a* furthermore also includes an embossed structure 1434 of the second metal sheet 2*b*, as well as a through-hole 1433 of the second metal sheet 2*b* including a through-hole edge 1436. In the top view of FIG. 14, only the area 1437 of the second metal sheet 2*b* is visible, which may be illuminated or observed through the through-hole 1431 of the first metal sheet 2*a*. The embossed structure 1434 of the second metal sheet 2*b* is apparent in this area 1437, which, similarly to the sub-structures 1432A-C of the embossed structure 1432 of the first metal sheet, is defined by an annular depression 1434 in the second metal sheet 2*b*.

FIG. 14B shows a bent sectional view along line B-B of FIG. 14A. This illustrates that the sub-structures 1432B, 1432C of the embossed structure 1432 each have the shape of a semi-bead and have the same maximum height. The same also applies to the uncut sub-structure 1432A not shown in the background.

In the exemplary embodiment of the separator plate 200 shown in FIG. 14A and FIG. 14B, the metal sheets 2*a*, 2*b* forming the separator plate 200 meet a first accuracy criterion, and are considered as having been aligned sufficiently precisely relative to one another, when the centroid 1447 of the triangle defined by the embossed structure 1432 of the first metal sheet 2*a* and the centroid 1449 of the area defined by the through-hole edge 1435 of the first metal sheet 2*a* are both situated inside the area of the through-hole 1433 of the second metal sheet 2*b*.

The metal sheets 2*a*, 2*b* forming the separator plate 200 meet a second accuracy criterion when the above-described first accuracy criterion is likewise met for a second measuring structure of the separator plate 200, which is of the same type as the above-described measuring structure 1400*a* and is spaced apart from the first measuring structure 1400*a*. During the positioning of the metal sheets 2*a*, 2*b* in the joining tool, the metal sheets 2*a*, 2*b* may thus, e.g., be joined when these meet the accuracy criteria described here based on FIGS. 14A and 14B for both measuring structures.

FIG. 15 shows a measuring structure 1500*a* of the separator plate 200 according to FIG. 4A in a top view, wherein, as in FIG. 4A, the viewing direction is oriented along the negative z direction 7. The measuring structure 1500*a* may replace the measuring structures 400*a*, 400*b*, 500, 600, 700, 800, 900, 1100, 1200, 1300, 1400*a* of the separator plate 200. However, the separator plate 200 may also include only one, several, in particular a total of two, or all of the measuring structures 400*a*, 400*b*, 500, 600, 700, 800, 900, 1100, 1200, 1300, 1500*a*, 1400*a*.

The measuring structure 1500*a* includes an embossed structure 1532, which is embossed into the first metal sheet 2*a* (hatched) and encompasses the two sub-structures 1532A-B. The sub-structures 1532A-B of the embossed structure 1532 of the first metal sheet 2*a* are each defined by annular depressions in the first metal sheet 2*a*. The measuring structure 1500 furthermore includes a through-hole 1531 in the first metal sheet 2*a*, which is surrounded and delimited by a rounded rectangular through-hole edge 1535. The sub-structures 1532A-B of the embossed structure 1532 of the first metal sheet 2*a* are arranged on both sides of the through-hole 1531. The sub-structures 1532A-B are arranged mirror-symmetrically with respect to two dash-dotted mirror planes 1545A, 1545B, which are each aligned parallel to the stacking direction 7. The rounded rectangular through-hole edge 1535 of the first metal sheet 2*a* defines a centroid 1549 of a rectangular area that is spanned by the through-hole edge 1535 and coincides with the axis of symmetry 1538 of the rectangular through-hole 1531.

The measuring structure 1500*a* furthermore also includes an embossed structure 1534 of the second metal sheet 2*b*. In the top view of FIG. 15, only the area 1537 of the second metal sheet 2*b* is visible, which may be illuminated or observed through the through-hole 1531 of the first metal sheet 2*a*. In this area 1537, the embossed structure 1534 of the second metal sheet 2*b* is apparent, which encompasses two sub-structures 1534A-B. Similarly to the sub-structures 1532A-B of the embossed structure 1532 of the first metal sheet 2*a*, the sub-structures 1534A-B of the embossed structure 1534 of the second metal sheet 2*b* are each defined by annular depressions in the second metal sheet 2*b*. The sub-structures 1534A-B of the embossed structure 1534 of the first metal sheet 2*b* are arranged mirror-symmetrically with respect to two mirror planes 1554A, 1554B, which are likewise aligned parallel to the stacking direction 7.

In the exemplary embodiment of the separator plate 200 shown in FIG. 15, the metal sheets 2*a*, 2*b* forming the separator plate 200 meet, e.g., a first accuracy criterion, and are considered as having been aligned sufficiently precisely relative to one another when an intersecting point 1556 of the mirror planes 1554A, 1554B is situated within a window 1550, which, e.g., is arranged around the centroid 1549 of the rectangular area spanned by the through-hole edge 1535. As an alternative accuracy criterion, it is also possible to consider the distance of the intersecting point 1556 of the mirror planes 1554A, 1554B of the first embossed structure 1534 of the second layer 2*b* relative to the intersecting point 1557 of the mirror planes 1545A, 1545B of the first through-hole 1531 of the first layer 2*a*, relative to a maximum permissible distance Smax. This criterion is at least met in a first approximation here, since the intersecting points 1556, 1557 of the aforementioned mirror planes coincide at least in the visual examination.

The metal sheets 2*a*, 2*b* forming the separator plate 200 meet a second accuracy criterion when the above-described first accuracy criterion is likewise met for a second measuring structure 1500*b* of the separator plate 200, which is not shown here and is of the same type as the above-described measuring structure 1500*a* and is spaced apart from the first measuring structure 1500*a*. During the positioning of the metal sheets 2*a*, 2*b* in the joining tool, the metal sheets 2*a*, 2*b* may thus, e.g., be joined when these meet the accuracy criteria described here both for the first and for the second measuring structure.

Figure 16:
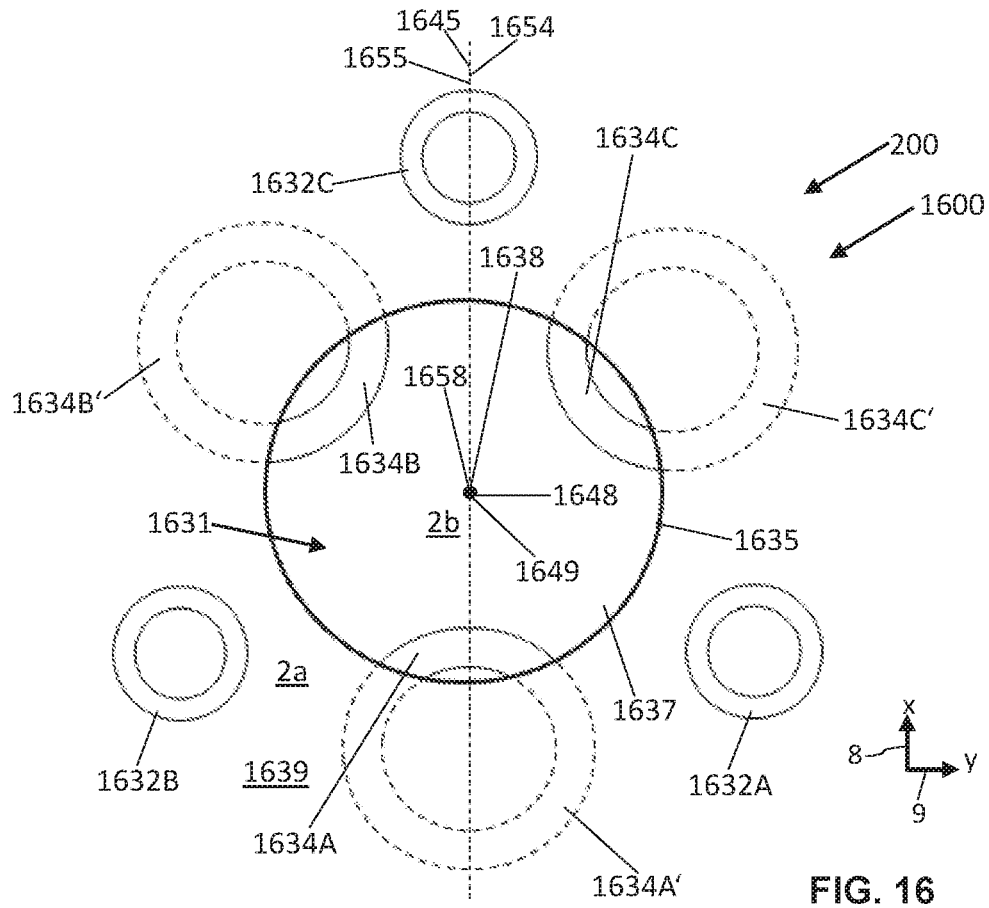

FIG. 16 shows a measuring structure 1600 of the separator plate 200 similar to FIG. 4A in a top view, wherein, as in FIG. 4A, the viewing direction is oriented along the negative z direction 7. The measuring structure 1600 may replace the measuring structures 400*a*, 400*b*, 500, 600, 700, 800, 900, 1100, 1200, 1300, 1400*a*, 1500*a* of the separator plate 200. However, the separator plate 200 may also include only one, several, in particular a total of two, or all of the measuring structures 400*a*, 400*b*, 500, 600, 700, 800, 900, 1100, 1200, 1300, 1400*a*, 1500*a*, 1600.

The first embossed structure 1632 of the first metal sheet 2*a* is composed of three sub-structures 1632A-C here, which are arranged around the first through-hole 1631 of the first metal sheet 2*a*. The first embossed structure 1634 of the second metal sheet 2*b* is also composed of three sub-structures 1634A-C, which are each, in the sections 1634A'-C' thereof, arranged outside the area 1637 of the second metal sheet 2*b* that is defined by a perpendicular projection of the at least one first through-hole 1631 of the first metal sheet 2*a* onto the second metal sheet 2*b*; as a result, it is only the remaining sections of the sub-structures 1634A-C which may be illuminated and via which the positioning of the two layers 2*a*, 2*b* with respect to one another is carried out.

Figure 17:
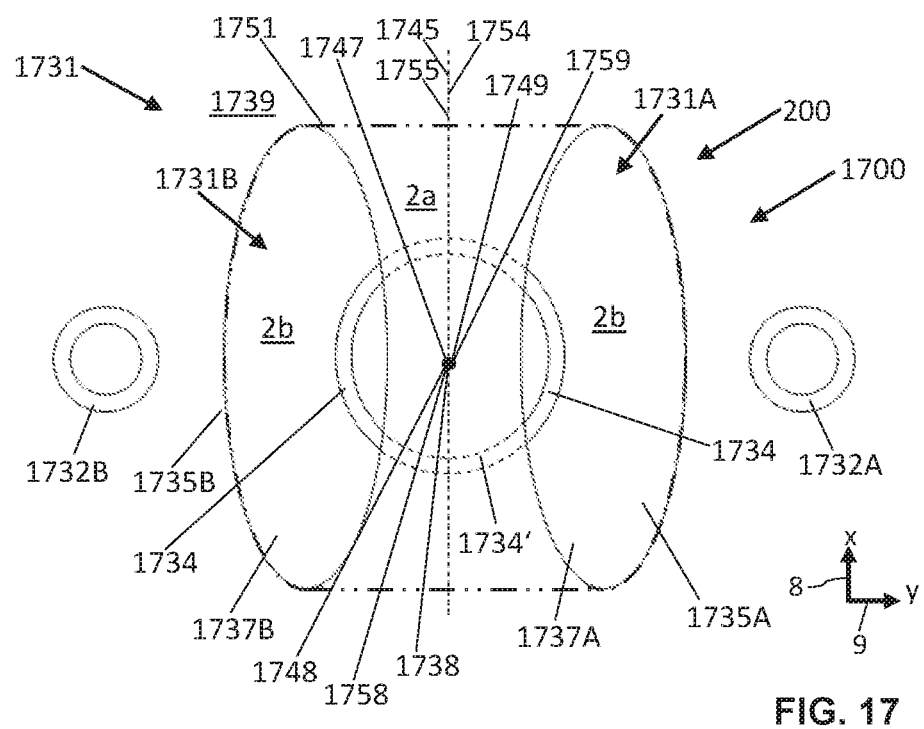

FIG. 17 shows a measuring structure 1700 of the separator plate 200 similar to FIG. 4A in a top view, wherein, as in FIG. 4A, the viewing direction is oriented along the negative z direction 7. The measuring structure 1700 may replace the measuring structures 400*a*, 400*b*, 500, 600, 700, 800, 900, 1100, 1200, 1300, 1400*a*, 1500*a*, 1600 of the separator plate 200. However, the separator plate 200 may also include only one, several, in particular a total of two, or all of the measuring structures 400*a*, 400*b*, 500, 600, 700, 800, 900, 1100, 1200, 1300, 1400*a*, 1500*a*, 1600, 1700.

In FIG. 17 as well, the embossed structure 1732 of the first metal sheet 2*a* is composed of sub-structures, namely of two sub-structures 1732A-B. In contrast to the preceding exemplary embodiments, the measuring structure 1700 includes not just one first through-hole in the first metal sheet 2*a*, but a group 1731 of first through-holes including two through-holes 1731A-B. These are jointly surrounded by an envelope 1751, which is represented by a long-dashed line here. Sections of the first embossed structure 1734 of the second metal sheet 2*b* are apparent through the two through-holes 1731A-B, that is, in the orthogonal projection of these through-holes 1731A-B onto the plane of the second metal sheet 2*b*, in the areas 1737A-B, between which the sections 1734' of the first embossed structure of the second metal sheet 2*b* are hidden by the first metal sheet 2*a*. In the optimal positioning of the two metal sheets 2*a*, 2*b* relative to one another, as it is shown in FIG. 17, the centroid 1749 of the envelope 1751 coincides both with the centroid 1759 of the embossed structure 1734 of the second metal sheet 2*b*, and with the centroid 1747 of the sub-structures 1732A-B of the embossed structure 1732 of the first metal sheet 2*a*.

Figure 18:
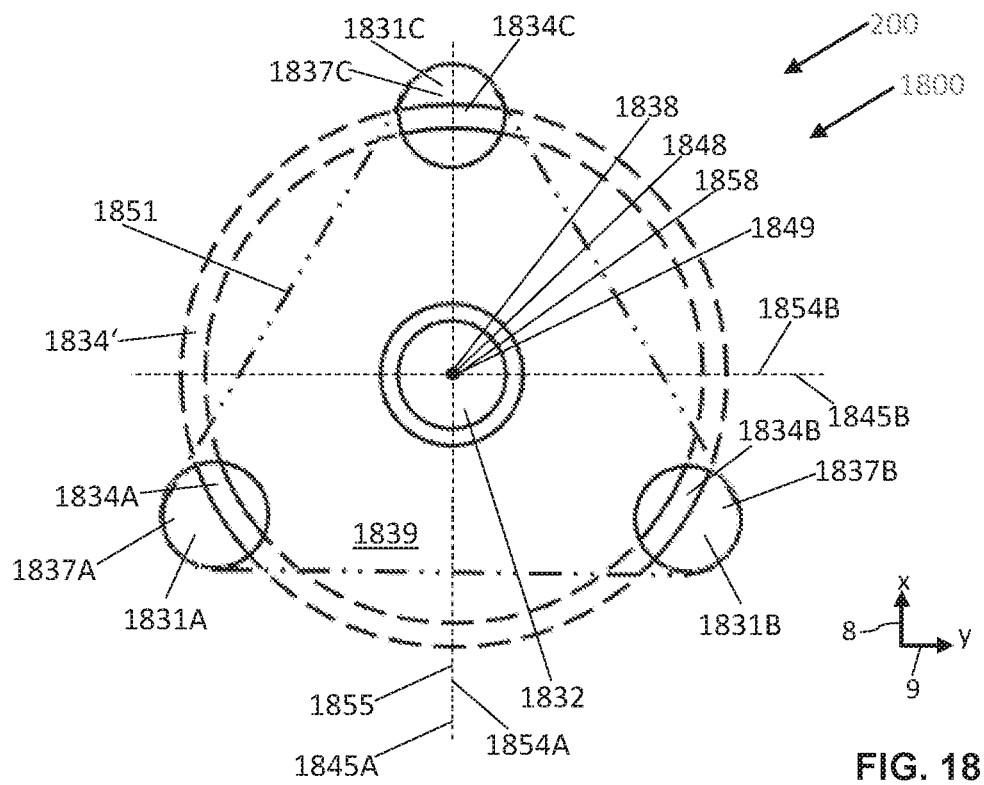

FIG. 18 shows a measuring structure 1800 of the separator plate 200 similar to FIG. 4A in a top view, wherein, as in FIG. 4A, the viewing direction is oriented along the negative z direction 7. The measuring structure 1800 may replace the measuring structures 400*a*, 400*b*, 500, 600, 700, 800, 900, 1100, 1200, 1300, 1400*a*, 1500*a*, 1600, 1700 of the separator plate 200. However, the separator plate 200 may also include only one, several, in particular a total of two, or all of the measuring structures 400*a*, 400*b*, 500, 600, 700, 800, 900, 1100, 1200, 1300, 1400*a*, 1500*a*, 1600, 1700, 1800.

FIG. 18 shows a measuring structure 1800 according to the second variant according to the invention. The first embossed structure 1832 of the first metal sheet 2*a* has a cross-section in the shape of a semi-bead and is surrounded by a group 1831 of first through-openings, which is composed of three through-openings 1831A-C here. Both the through-openings 1831A-C and the first embossed structure 1832 have a substantially circular design. The first embossed structure 1832 of the first metal sheet 2*a* is still surrounded by a first embossed structure 1834 of the second metal sheet 2*b*, which in only three sections 1834A-C is located in areas 1837A-C that arise during an orthogonal projection of the group 1831 of first through-openings 1831A-C onto the second metal sheet 2*b*. The two metal sheets 2*a*, 2*b* are arranged very precisely with respect to one another, the axis of symmetry 1858 of the first embossed structure 1832 of the first metal sheet 2*a*, the axis of symmetry 1848 of the first embossed structure 1834 of the second metal sheet 2*b* and the axis of symmetry of the envelope 1851 of the group 1831 of first through-openings 1831A-C all coincide and are located in the centroid of the envelope 1851 of the group 1831 of first through-openings 1831A-C. Likewise, the only mirror plane 1855 of the group 1831 of first through-openings 1831A-C coincides with the mirror planes 1845A of the first embossed structure 1832 of the first metal sheet 2*a* and 1854A of the first embossed structure 1834 of the second metal sheet 2*b*, and furthermore the mirror planes 1845B of the first embossed structure 1832 of the first metal sheet 2*a* and 1854B of the first embossed structure 1834 of the second metal sheet 2*b*.

Figure 19:
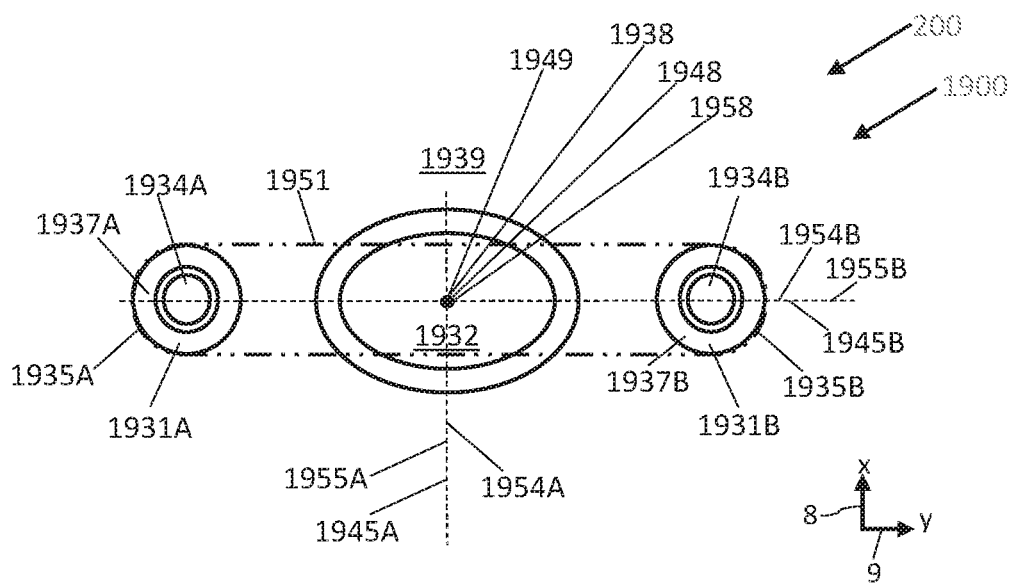

FIG. 19 shows a measuring structure 1900 of the separator plate 200 similar to FIG. 4A in a top view, wherein, as in FIG. 4A, the viewing direction is oriented along the negative z direction 7. The measuring structure 1900 may replace the measuring structures 400*a*, 400*b*, 500, 600, 700, 800, 900, 1100, 1200, 1300, 1400*a*, 1500*a*, 1600, 1700, 1800 of the separator plate 200. However, the separator plate 200 may also include only one, several, in particular a total of two, or all of the measuring structures 400a, 400b, 500, 600, 700, 800, 900, 1100, 1200, 1300, 1400a, 1500a, 1600, 1700, 1800, 1900.

FIG. 19 likewise shows a measuring structure 1900 according to the second variant according to the invention. The first embossed structure 1932 of the first metal sheet 2a is oval in a top view and has a cross-section in the shape of a semi-bead, and is surrounded by a group 1931 of first through-openings, which is composed of two through-openings 1931A-B here. The first embossed structure 1932 of the first metal sheet 2a is still surrounded by a first embossed structure 1934 of the second metal sheet 2b, which is composed of a sub-structure comprising two semi-bead-shaped embossed structures 1834A-B, which are each located completely in areas 1937A-B that arise during an orthogonal projection of the group 1931 of first through-openings 1931A-B onto the second metal sheet 2b. Both the through-openings 1931A-B and the sub-structures 1934A-B have a substantially circular design. The two metal sheets 2a, 2b are arranged very precisely with respect to one another, the axis of symmetry 1958 of the first embossed structure 1932 of the first metal sheet 2a, the axis of symmetry 1948 of the first embossed structure 1934 of the second metal sheet 2b and the axis of symmetry of the envelope 1951 of the group 1931 of first through-openings 1931A-B all coincide and are located in the centroid of the envelope 1951 of the group 1931 of first through-openings 1931A-B. Likewise, the mirror plane 1955A of the group 1931 of first through-openings 1931A-B coincides with the mirror planes 1945A of the first embossed structure 1932 of the first metal sheet 2a and 1954A of the first embossed structure 1934 of the second metal sheet 2b, and furthermore the mirror planes 1955B of the group 1931 of first through-openings 1931A, 1945B of the first embossed structure 1932 of the first metal sheet 2a and 1954B of the first embossed structure 1934 of the second metal sheet 2b.

The invention claimed is:

1. A separator plate assembly for an electrochemical system, comprising a first metal sheet and a second metal sheet which are in contact with one another at least in areas along the flat sides thereof facing one another,
the first metal sheet and second metal sheet each comprising a flow field and a perimeter sealing bead surrounding the flow field,
the first metal sheet including a first through-hole centered on a first central axis and a first embossed structure centered on a second central axis, the first embossed structure surrounding the first through-hole of the first metal sheet,
the first embossed structure and the at least one the first through-hole positioned outside of the respective perimeter sealing bead,
the second metal sheet including a second embossed structure, which is arranged at least in sections in an area of the second metal sheet that is defined by a perpendicular projection of the first through-hole, or of the group of first through-holes, of the first metal sheet onto the second metal sheet and centered on a third central axis, the second embossed structure positioned outside of the respective perimeter sealing bead, and
an offset between the first central axis and the second central axis is below a first maximum offset distance, and an offset between the second central axis and the third central axis is below a second maximum offset distance.

2. The separator plate assembly according to claim 1, wherein the first embossed structure of the first metal sheet includes an embossed structure that completely encloses the first through-hole, or the group of first through-holes, of the first metal sheet.

3. The separator plate according to claim 1, wherein the first embossed structure of the first metal sheet includes a plurality of sub-structures, which are arranged around the first through-hole, or the group of first through-holes, of the first metal sheet.

4. A separator plate assembly for an electrochemical system, comprising a first metal sheet and a second metal sheet which are in contact with one another at least in areas along the flat sides thereof facing one another,
the first metal sheet and second metal sheet each comprising a flow field and a perimeter sealing bead surrounding the flow field,
the first metal sheet comprising a first embossed structure centered on a first central axis, and a group of first through-holes surrounding the first embossed structure and centered on a second central axis, and the first embossed structure, and the group of first through-holes positioned outside of the respective perimeter sealing bead,
the second metal sheet comprising a second embossed structure centered on a third central axis which are arranged at least in sections in an area of the second metal sheet that is defined by a perpendicular projection of the group of first through-holes of the first metal sheet onto the second metal sheet, and
an offset between the first central axis and the second central axis is below a first maximum offset distance, and an offset between the second central axis and the third central axis is below a second maximum offset distance.

5. The separator plate assembly according to claim 4, wherein the second embossed structure of the second metal sheet comprises an embossed structure that completely encloses the first embossed structure of the first metal sheet.

6. The separator plate assembly according to claim 4, wherein the second embossed structure of the second metal sheet comprises a plurality of sub-structures, which are arranged around the first embossed structure of the first metal sheet.

7. The separator plate assembly according to claim 4, wherein the first embossed structure of the first metal sheet is entirely, or at least partially, raised above a first sheet plane in a direction facing away from the second metal sheet, perpendicular to the first sheet plane, the first sheet plane defined by the first metal sheet.

8. The separator plate assembly according to claim 4, wherein the first embossed structure of the first metal sheet is spaced apart from the first through-hole, or an envelope around the group of first through-holes, of the first metal sheet.

9. The separator plate assembly according to claim 4, wherein the first embossed structure of the first metal sheet is minor-symmetrical with respect to at least one minor plane, said mirror plane being situated perpendicularly on a first sheet plane defined by the first metal sheet.

10. The separator plate assembly according to claim 4, wherein the first embossed structure of the first metal sheet is rotation-symmetrical with respect to an axis of symmetry, said axis of symmetry being situated perpendicularly on a first sheet plane defined by the first metal sheet.

11. The separator plate assembly according to claim 4, wherein the first through-hole edge of the first metal sheet, or the envelope of the group of first through-holes, is mirror-symmetrical with respect to at least one minor plane, said minor plane being situated perpendicularly on a first sheet plane defined by the first metal sheet.

12. The separator plate assembly according to claim 4, wherein the first through-hole edge, or the envelope of the group of first through-holes, of the first metal sheet is rotation-symmetrical with respect to an axis of symmetry, said axis of symmetry being situated perpendicularly on a first sheet plane defined by the first metal sheet.

13. The separator plate assembly according to claim 4, wherein the second metal sheet includes a first through-hole, the second embossed structure of the second metal sheet being arranged around the first through-hole of the second metal sheet.

14. The separator plate assembly according to claim 4, wherein the second embossed structure of the second metal sheet is minor-symmetrical with respect to a mirror plane of the second embossed structure of the second metal sheet, this minor plane being situated perpendicularly on a second sheet plane defined by the second metal sheet.

15. The separator plate assembly according to claim 4, wherein the second embossed structure of the second metal sheet is rotation-symmetrical with respect to an axis of symmetry of the second embossed structure of the second metal sheet, this axis of symmetry being situated perpendicularly on a second sheet plane defined by the second metal sheet.

* * * * *